United States Patent
Wang et al.

(10) Patent No.: US 11,719,840 B2
(45) Date of Patent: Aug. 8, 2023

(54) SUBSURFACE WAVE SLOWNESS PREDICTION SYSTEM

(71) Applicant: Halliburton Energy Services, Inc., Houston, TX (US)

(72) Inventors: Ruijia Wang, Singapore (SG); Richard Timothy Coates, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 940 days.

(21) Appl. No.: 16/499,955

(22) PCT Filed: Dec. 28, 2018

(86) PCT No.: PCT/US2018/067805
§ 371 (c)(1),
(2) Date: Oct. 1, 2019

(87) PCT Pub. No.: WO2020/139362
PCT Pub. Date: Jul. 2, 2020

(65) Prior Publication Data
US 2021/0109241 A1    Apr. 15, 2021

(51) Int. Cl.
*G01V 1/50* (2006.01)
*G01V 1/28* (2006.01)
*G01V 1/30* (2006.01)

(52) U.S. Cl.
CPC .............. *G01V 1/284* (2013.01); *G01V 1/288* (2013.01); *G01V 1/303* (2013.01); *G01V 1/50* (2013.01)

(58) Field of Classification Search
CPC ........ G01V 1/284; G01V 1/288; G01V 1/303; G01V 1/50; G01V 1/28; G01V 1/00;
(Continued)

(56) References Cited

U.S. PATENT DOCUMENTS 4,594,691 A * 6/1986 Kimball ................... G01V 1/48
                                                                 702/6
6,470,275 B1 * 10/2002 Dubinsky .............. G01V 1/368
                                                                 702/9
(Continued)

FOREIGN PATENT DOCUMENTS

GB          2450163 A      12/2008
WO     2014070182 A1      5/2014
(Continued)

OTHER PUBLICATIONS

PCT Application Serial No. PCT/US2018/067805, International Search Report, dated Sep. 25, 2019, 3 pages.
(Continued)

*Primary Examiner* — Mohamed Charioui
(74) *Attorney, Agent, or Firm* — Delizio, Peacock, Lewin & Guerra

(57) ABSTRACT

An apparatus includes a mechanical wave source; a set of mechanical wave sensors in a borehole to provide subsurface wave measurements based on formation waves from the mechanical wave source, and a processor. The apparatus also includes a machine-readable medium having program code to acquire the subsurface wave measurements, select a first set of tool wave measurements based on the subsurface wave measurements, and generate a set of filtered subsurface wave measurements by filtering the subsurface wave measurements based on the first set of tool wave measurements. The program code also includes instructions to generate a time-domain semblance map based on the set of filtered subsurface wave measurements, wherein the time-domain semblance map includes an initial set of compression wave peaks, determine a selected qualified compression wave peak based on a semblance value in the time-domain sem-
(Continued)

blance map, and determine a compression wave slowness based on the selected qualified compression wave peak.

23 Claims, 17 Drawing Sheets

(58) Field of Classification Search
CPC ... G01V 1/30; G01V 1/48; G01V 1/44; G01V 1/40; G01V 1/52; G01V 2210/6222
See application file for complete search history.

(56) References Cited

U.S. PATENT DOCUMENTS

| | | |
|---|---|---|
| 6,625,541 B1 | 9/2003 | Shenoy et al. |
| 6,868,341 B2 | 3/2005 | Valero |
| 7,089,119 B2 | 8/2006 | Mandal |
| 7,120,541 B2 | 10/2006 | Wang |
| 7,337,068 B2 | 2/2008 | Valera |
| 8,521,433 B2 | 8/2013 | Hirabayashi et al. |
| 2012/0147702 A1* | 6/2012 | Valero .................. G01V 1/48 367/25 |
| 2013/0238248 A1 | 9/2013 | Aeron et al. |
| 2014/0005946 A1* | 1/2014 | Mandal .................. G01V 1/48 702/17 |
| 2014/0195188 A1 | 7/2014 | Donderici |
| 2016/0377751 A1 | 12/2016 | De Meersman |
| 2017/0102475 A1 | 4/2017 | Mukhopadhyay et al. |
| 2018/0038980 A1* | 2/2018 | Goodyear ............... G01V 1/50 |

FOREIGN PATENT DOCUMENTS

| | | |
|---|---|---|
| WO | 2017172792 A1 | 10/2017 |
| WO | 2017205075 A1 | 11/2017 |
| WO | WO-2018084847 A1 * | 5/2018 ............ E21B 47/00 |

OTHER PUBLICATIONS

PCT Application Serial No. PCT/US2018/067805, International Written Opinion, dated Sep. 25, 2019, 6 pages.
Haldorsen, et al., "Borehole Acoustic Waves", Oilfield Review, Spring 2006, pp. 34-43.

* cited by examiner

SUBSURFACE WAVE SLOWNESS PREDICTION SYSTEM

BACKGROUND

The disclosure generally relates to the field of subsurface characterization and more particularly to seismic signal processing.

Mechanical wave logging measurements play an important role in a variety of geophysical, geological, and engineering applications. One purpose of mechanical wave logging is to use slowness log profiles of waves propagating through a formation to determine the properties of their corresponding wave properties. Slowness processing provides a source of information regarding at least one formation property such as formation pressure and formation elasticity, which helps optimize geosteering decisions and well operations. Determining slowness profiles, especially in real-time operations (e.g. during drilling operations, well treatment operations, other active operations, etc.) requires efficient slowness processing.

Possible effects that increase measurement noise and processing challenges during slowness processing include the effects of tool waves, road noise, poor borehole conditions, low signal-to-noise ratios (SNR), modal interferences between compressional (P-) wave trains and leaky-P-wave trains, dispersion effects of borehole modes, multiple wave arrivals of P-waves, multiple shear (S-) waves in a wave train and/or Stoneley waves. In the case of logging while drilling (LWD) applications, seismic interpretations also face further processing challenges from the drilling noise that drowns useful signals of formation arrivals and bias formation P-wave arrivals. Such processing challenges increase the difficulty of automated, real-time LWD operations and decision-making.

BRIEF DESCRIPTION OF THE DRAWINGS

Embodiments of the disclosure can be better understood by referencing the accompanying drawings.

DESCRIPTION OF EMBODIMENTS

Figure 1:
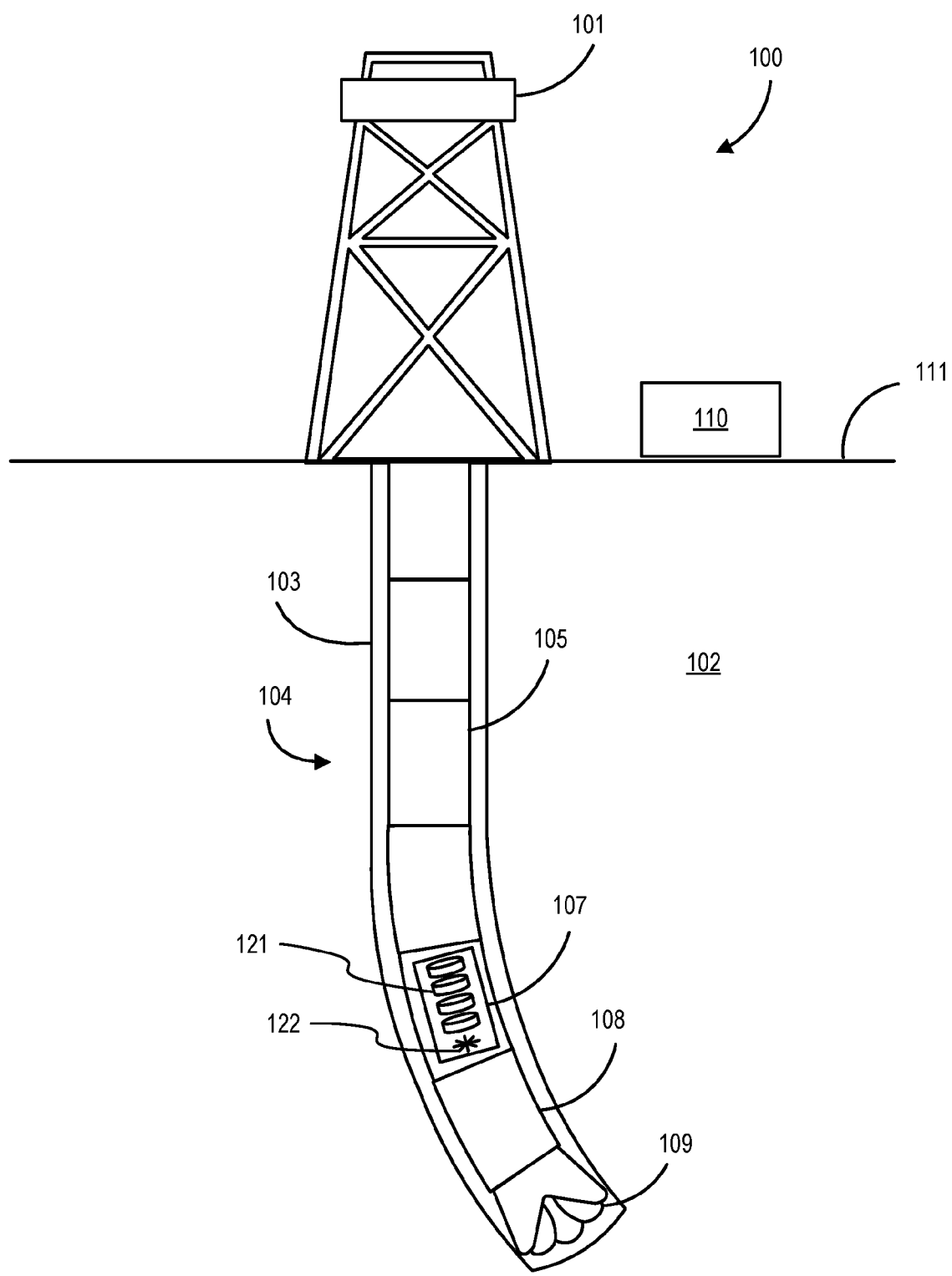
FIG. 1 is an elevation view of an onshore drilling system operating a downhole drilling assembly that includes a mechanical wave logging system.

The description that follows includes example systems, methods, techniques, and program flows that embody embodiments of the disclosure. However, it is understood that this disclosure can be practiced without these specific details. For instance, this disclosure refers to semblance processing using a differential-phase-time-semblance (DPTS) map. Aspects of this disclosure can instead be applied to other multi-dimensional time-domain maps. In other instances, well-known instruction instances, protocols, structures and techniques have not been shown in detail in order to avoid obfuscating the description.

Various embodiments relate to a slowness prediction system that identifies formation wave slowness for various waves and/or modes. The slowness prediction system uses an adaptive filter to generate a set of noise-reduced measurements, determines a set of travel times in the set of noise-reduced measurement, and identifies which of the travel times are compression wave travel times (also referred to as Delta Time Compressional, or DTC) and shear wave travel times (also referred to as Delta Time Refracted Shear, or DTRS). In some embodiments, DTC values are measurements of compression wave slowness and DTRS values are measurements of shear wave slowness. Accurately identifying the DTC and DTRS can increase the accuracy of seismic characterization operations and well operations that rely on accurate seismic characterizations.

A slowness prediction system uses an adaptive filter that includes several sub-filters to remove the effects of tool waves and their corresponding tool wave travel times (also referred to as Delta Time of the tool waves, or $DT_{tool}$). The slowness prediction system reconstructs a common offset gather (COG) based on the subsurface wave measurements, wherein a COG is a collection of subsurface wave measurements that share a common offset from a mechanical wave source. A mechanical wave source can generate mechanical wave signals such as acoustic pulses, formation waves (e.g. compressional waves and shear waves traveling through a formation which are not limited to any particular frequency in this application and further defined below), types of formation waves such as seismic waves (i.e. formation waves which have a frequency up to 100 Hertz) and sonic waves (i.e. formation waves that have a frequency greater than 100 Hertz), non-seismic mechanical waves (e.g. waves that travel directly through a tool without having traveled through the formation), etc. These mechanical wave signals can be measured by mechanical wave sensors to produce mechanical wave measurements such as subsurface wave measurements of formation waves. The subsurface wave measurements are measurements of formation waves that can have either traveled directly from a mechanical wave source to the mechanical wave sensor through a formation(s) or can have also traveled through other non-formation components such as a tool, insulation, metallic pipe, etc. The COG can be used to select a set of tool wave measurements and generate tool wave predictions.

These tool wave predictions can be compared to tool wave template predictions within a time window, wherein the time window includes a time prediction for when the first tool waves arrive at a mechanical wave sensor measuring its respective tool wave. Examples of comparing tool waves include determining whether a ratio of a tool wave template and a local tool wave exceed a limit and/or whether a compressional wave is faster or slower than the tool waves.

The adaptive filter includes operations to generate filtered subsurface wave measurements based on the tool wave measurements. For example, the adaptive filter includes operations to determine whether a DTC is slower than a $DT_{tool}$. In the case that the DTC is slower than the $DT_{tool}$, adaptive filtering includes using additional filters to mitigate the effect of a tool wave on the subsurface wave measurements and generate the adaptively filtered subsurface wave measurements. Additional filters can include multiplying values in the filtered measurements by a set of weights based on the comparison. Additional filters can also include a frequency-wavenumber (F-K) filter for a common-offset array and can also be applied during other stages of operation, such as during a subtraction of wave values from subsurface wave measurements to determine the tool wave arrivals. The adaptive filter can include semblance processing operations for the adaptively filtered subsurface wave measurements.

The adaptive filter can include a set of semblance processing operations that include applying a slowness-time mask to a DPTS map, wherein the DPTS map is a semblance map in the time domain that is generated based on the adaptively filtered subsurface wave measurements. The semblance processing operations can include using the slowness-time mask to filter for a set of measurement peaks (hereinafter "peaks") corresponding with formation waves and filter out a set of non-target peaks (e.g. alias peaks, noise peaks, etc.) from the DPTS map while keeping target peaks such as compression wave peaks and shear wave peaks in the DPTS map. The slowness-time mask is controllable using a set of parameters based on the travel time of a mode, wherein a mode describes a pattern of wave motion (e.g. compression mode, shear mode, etc.). The adaptive filter can also include one or more semblance thresholds to further filter peaks into an initial set of mode-labeled peaks, wherein the mode-labeled peaks are labeled with a wave mode such as compression or shear. The set of semblance processing operations can also include operations to generate a slowness prediction curve based on the initial set of mode-labeled peaks and filter for additional peaks within a threshold range of the slowness prediction curve. For example, after determining a set of the compression wave peaks by applying a filter based on a compression wave slowness prediction curve, the system can select one or more qualified compression wave peaks to determine a DTC or other measurement of compression wave slowness. The adaptive filter can also include operations to fill in missing travel time values based on at least one of the travel time of the wave peaks of neighboring measurements (or their corresponding boundary travel times).

Furthermore, the adaptive filter can include a shear-specific adaptive filter, wherein the DTC values generated from the set of semblance processing operations are used to generate a shear searching range that includes shear wave peaks and filters out DTC values and mud wave travel time (DTM) values. In some embodiments, the DTC and other values based on compression wave measurements can be used to determine a lower bound of the searching range, and measurements based on mud wave values can be used to determine an upper bound of the searching range. The shear-specific adaptive filter can include a second iteration of the set of semblance processing operations on the peaks in the shear searching range to determine a set of DTRS values or other measurements of shear wave slowness.

By applying the adaptive filter, various processing challenges of determining a DTC and DTRS can be mitigated. Such processing challenges include the effects of formation anisotropy, multi-shear arrivals for tilted/horizontal wells, mud compressional arrival interference, radial- (PR-)Rayleigh waves near an Airy-Phase frequency, and/or other processing challenges described above. For example, the adaptive filter can mitigate the dispersion effects from PR-Rayleigh waves at frequencies near shear-wave resonance frequencies. By mitigating these challenges, the slowness prediction system can more accurately and efficiently determine DTC values, DTRS values, and their corresponding wave information. These values can be used to provide more accurate measurements of formation properties and optimize geosteering operations, well treatment operations, and other operations of a formation.

Example Well Systems

FIG. 1 is an elevation view of an onshore drilling system operating a downhole drilling assembly that includes a mechanical wave logging system. A drilling system 100 includes a rig 101 located at a formation surface 111 and positioned above a borehole 103 within a subterranean formation 102. In certain embodiments, a drilling assembly 104 can be coupled to the rig 101 using a drill string 105. In other embodiments, the drilling assembly 104 can be coupled to the rig 101 using a wireline or a slickline, for example. The drilling assembly 104 can include a bottom hole assembly (BHA) 106. The BHA 106 can include a drill bit 109, a steering assembly 108, and a LWD/measurement-while-drilling (MWD) apparatus having a sonic tool 107. The sonic tool 107 can include a set of receivers 121 and a mechanical wave transmitter 122. A control and mechanical wave sensor system 110 located at the formation surface 111 can include a processor and memory device and can communicate with elements of the BHA 106 (e.g., logging tools in the LWD/MWD apparatus). The control and mechanical wave sensor system 110 can receive data from and send control signals to the BHA 106 or components thereof. Additionally, in some embodiments, at least one processor and memory device can be located downhole within the BHA 106 for the same purposes. The sonic tool 107 can log the subterranean formation 102 both while the borehole 103 is being drilled, and after the borehole 103 is drilled to provide information regarding ongoing subterranean operations. The control and mechanical wave sensor system 110 can also receive data from and send control signals to the sonic tool 107.

In particular embodiments, the control and mechanical wave sensor system 110 can receive subsurface wave measurements associated with the subterranean formation 102 based on disturbances (e.g. formation waves) in the subterranean formation 102. These disturbances can include one or more mechanical waves generated by the mechanical wave transmitter 122 in the sonic tool 107. The mechanical wave transmitter 122 can include a mechanical or hydraulic element which can be actuated to generate a single mechanical wave at a single pulse (i.e. a single mechanical wave pulse without neighboring pulses provided at a frequency), a continuous mechanical wave at a single frequency, and/or a combination of mechanical waves with multiple frequencies. Mechanical waves generated by the mechanical wave transmitter 122 or other formation/mechanical wave sources can travel through the subterranean formation 102 and/or the sonic tool 107 and be measured by the receivers 121, which can transmit subsurface wave measurements to the control and mechanical wave sensor system 110. In some embodiments, the direction or speed of the drill bit 109 can be changed based on the presence of geologic features indicated by a seismic profile.

Modifications, additions, or omissions can be made to FIG. 1 without departing from the scope of the present disclosure. For example, multiple mechanical wave transmitters can be used in conjunction with the drilling system 100 and the control and mechanical wave sensor system 110. Moreover, components can be added to or removed from the drilling system 100 without departing from the scope of the present disclosure.

Figure 2:
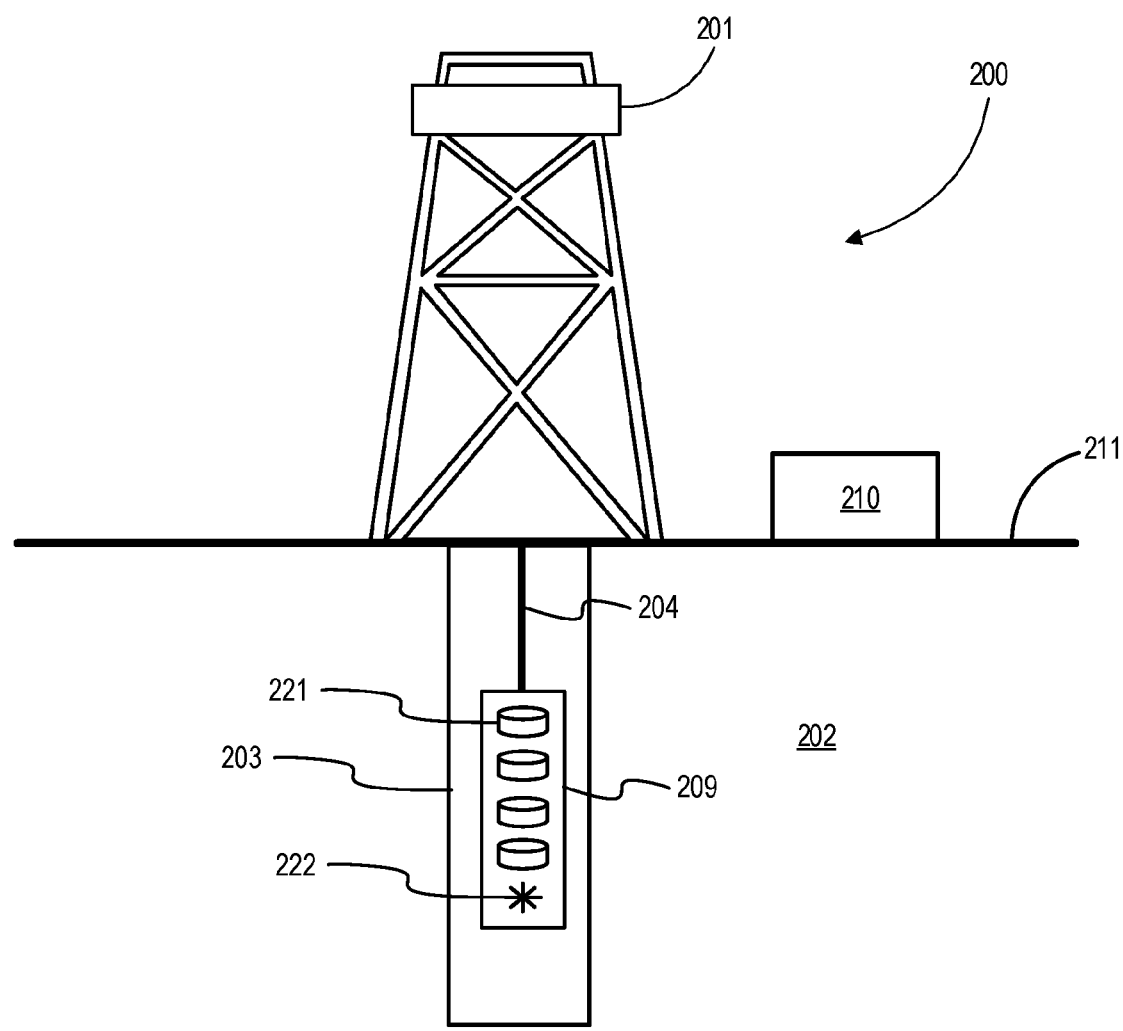
FIG. 2 is an elevation view of an onshore wireline system operating a wireline tool that includes a mechanical wave logging system.

FIG. 2 is an elevation view of an onshore wireline system operating a wireline tool that includes a mechanical wave logging system. A wireline system 200 includes a rig 201 located at a surface 211 and positioned above a wellbore 203 within a subterranean formation 202. The wireline system 200 can include a wireline 204 supporting a sonic tool 209 which can collect various types of information about the wellbore 203 and the subterranean formation 202 such as porosity, resistivity, hydrocarbon presence, gas presence, etc. A control and mechanical wave sensor system 210 located at the surface 211 can include a processor and memory device and can communicate with elements of the sonic tool 209. The sonic tool 209 can include a set of receivers 221 and a mechanical wave transmitter 222. The mechanical wave transmitter 222 can generate a mechanical wave signal into the subterranean formation 202 and/or the sonic tool 209. The mechanical wave signal can be measured as subsurface wave measurements and/or other mechanical wave measurements by the set of receivers 221. The control and mechanical wave sensor system 210 can acquire subsurface wave measurements and/or other mechanical wave measurements from the sonic tool 209 while the sonic tool 209 is in motion. In addition, the control and mechanical wave sensor system 210 can acquire subsurface wave measurements from the sonic tool 209 while the sonic tool 209 is stationary.

Example Flowcharts

Figure 3:
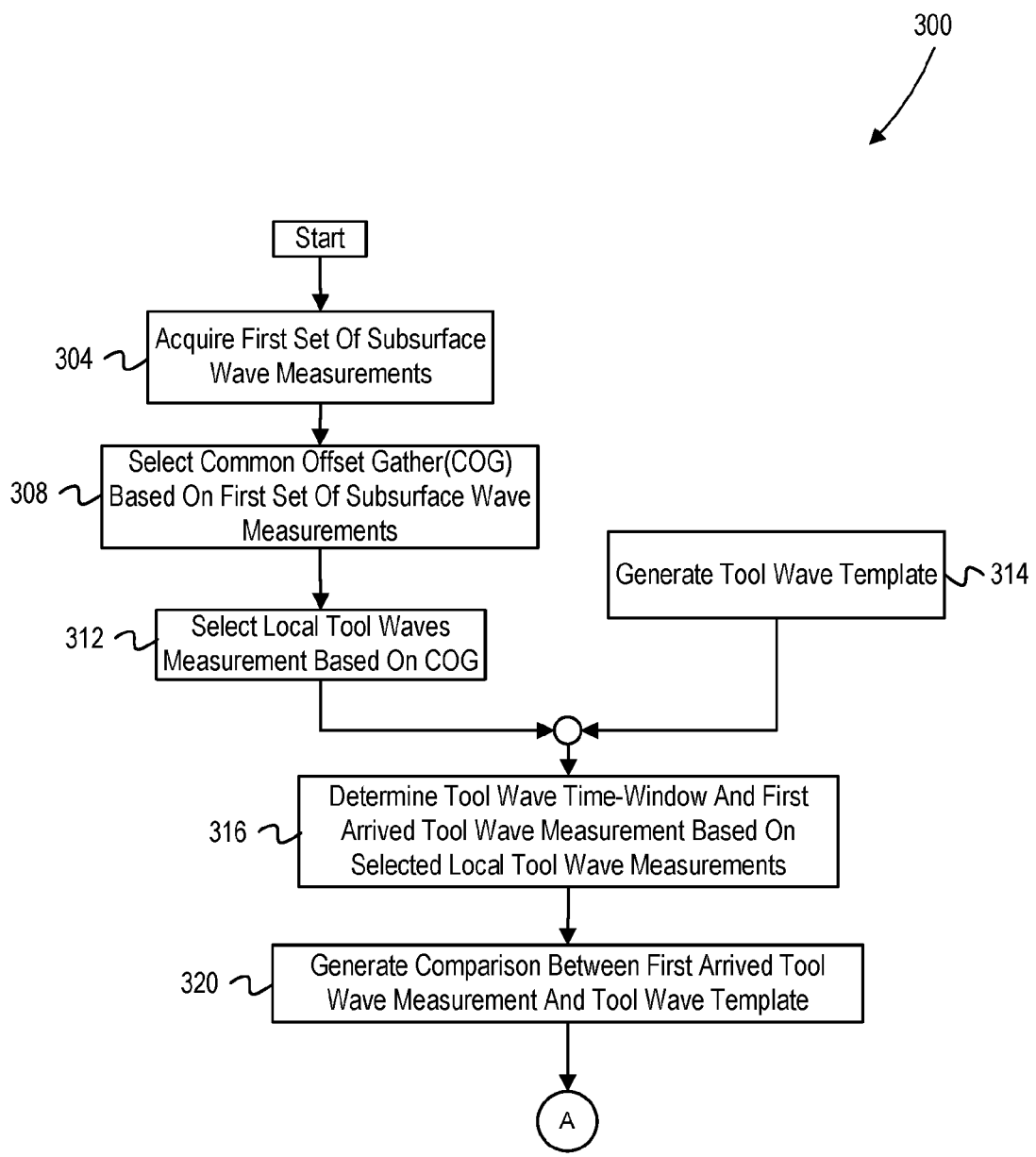
FIG. 3 depicts a flowchart of operations to apply an adaptive filter to subsurface wave measurements.

FIG. 3 depicts a flowchart of operations to apply an adaptive filter to subsurface wave measurements. FIG. 3 depicts a flowchart 300 of operations that are described with reference to a system comprising a processor. Operations of the flowchart 300 start at block 304.

At block 304, the system acquires a first set of subsurface wave measurements. The subsurface wave measurements can be acquired from seismic sensors. For example, with reference to FIGS. 1-2 above, the subsurface wave measurements can be acquired from sensors on the sonic tool 107, sensors attached to the wireline 204, and/or sensors in the sonic tool 209. The subsurface wave measurements can be acquired directly from mechanical wave sensors or retrieved from a non-transitory machine-readable medium.

At block 308, the system selects a common offset gather (COG) based on the first set of subsurface wave measurements. Selecting the COG can include selecting a set of subsurface wave measurements having a shared distance from a mechanical wave transmitter. For example, with reference to FIG. 2, the system can select a set of subsurface wave measurements as the COG, wherein each of the set of subsurface wave measurements share a same distance (within an acceptable distance threshold) from the mechanical wave transmitter 122.

At block 312, the system determines local tool wave measurements based on the COG. In some embodiments, the local tool wave measurements can be determined using the COG by assigning a subset of wave measurements from the COG to be local tool waves, wherein local tool waves can be determined based on a length value that is proportional to the tool length. The local tool waves might be calculated by applying a filter on the COG, for example, a frequency-wavenumber (FK) filters that keeps the waves with the same travel times. Alternatively, the local tool waves might be computed by stacking all the COG waveforms, wherein stacking a set of waveforms or other measurements includes taking the average of the set of waveforms or other measurements at different depths. Since only a subset of the COG data is utilized in constructing the tool waves, the waves are local-predicted, making the waves a type of local-predicted tool wave measurements.

At block 314, the system generates a tool wave template. In some embodiments, a tool wave template can be generated based on a fluid tank test, wherein the measurements provided by sensors of calibration waves generated by a wave-generation mechanism propagating through a fluid in a testing chamber (e.g. a tank) are used as the tool wave template. Alternatively, or in addition, the tool wave template can be generated based on result data retrieved from a database in a non-transitory machine-readable medium, such as a database that includes subsurface wave measurements from soft formations (e.g. carbonate).

At block 316, the system determines a tool wave time window and a first arrived tool wave measurement based on the local tool wave measurements. The system can determine the tool wave time window based on a set of formation properties and known tool wave properties. For example, based on a set of formation and/or wave properties that includes a maximum wave speed through the formation and a known tool wave propagation speed, the system can set a time window as between 500 microseconds and 1000 microseconds. The system can use the tool wave time window to filter out a subset of subsurface wave measurements as non-tool measurements and allow the system to focus on potential tool measurements, wherein the potential tool measurements are selected based on being within a range of waves that could have propagated through a tool. The first arrived tool wave within the tool wave time window can be set as a qualified first arrived tool wave.

At block 320, the system generates a comparison of the first arrived tool wave measurement and the tool wave template. In some embodiments, the system can generate the comparison by calculating a comparison value (e.g. a difference, a ratio, etc.) between the first arrived tool wave and the tool wave template. In alternative embodiments, a full local tool wave measurement other than the first arrived tool wave measurement can be used. For example, a comparison between a local tool wave measurement having the greatest amplitude amongst a set of tool wave measurements and the tool wave template can be used. The comparison value can be a ratio of amplitudes between the local tool wave measurement and the tool wave template as shown below in Equation 1, where r is a ratio, $AMP_{local}$ is the amplitude of a local tool wave (e.g. the first arrived tool wave), and $AMP_{template}$ is the amplitude of a tool wave template, the difference and ratio comparisons can be determined as follows:

$$r = \frac{AMP_{local}}{AMP_{template}} \quad \text{Eq. 1}$$

The system can set a formation-to-tool threshold to determine if the formation compression wave slowness is faster or slower than tool waves. The formation-to-tool threshold can be compared to the comparison value. For example, the formation-to-tool threshold for a ratio comparison can be used as shown below in Equation 2, where $r_{th}$ is the formation-to-tool threshold for a ratio comparison, DTC is the formation compression wave slowness, and $DT_{tool}$ is the tool wave slowness:

$$\begin{cases} DTC \geq DT_{tool} + k & r \leq r_{th} \\ DTC < DT_{tool} + k & r > r_{th} \end{cases} \quad \text{Eq. 2}$$

As shown above, when the comparison value exceeds the formation-to-tool threshold, the DTC is determined to be less (and thus faster) than the tool wave slowness by at least k units of slowness, wherein units of slowness can be dimensionless (e.g. normalized by a normalizing slowness value) or dimensional (e.g. 'microseconds per foot'). Otherwise, the DTC is considered to be greater than or equal to (and thus slower than or equal to) the tool wave slowness by at least k units of slowness. In some embodiments, the comparison between DTC and $DT_{tool}$ can be determined independently of a determination of a numeric value for DTC. In some embodiments, values for k can include 0, 10, 100, or some other threshold units. Moreover, the tool wave ratio can provide information useful for determining a qualified tool wave value from both the local predicted tool waves and tool wave template, as described further below in the description of block 424 of FIG. 4 and Equations 3-4. After the comparison is generated, operations of the flowchart 300 can proceed to operations of the flowchart 400 in FIG. 4.

Figure 4:
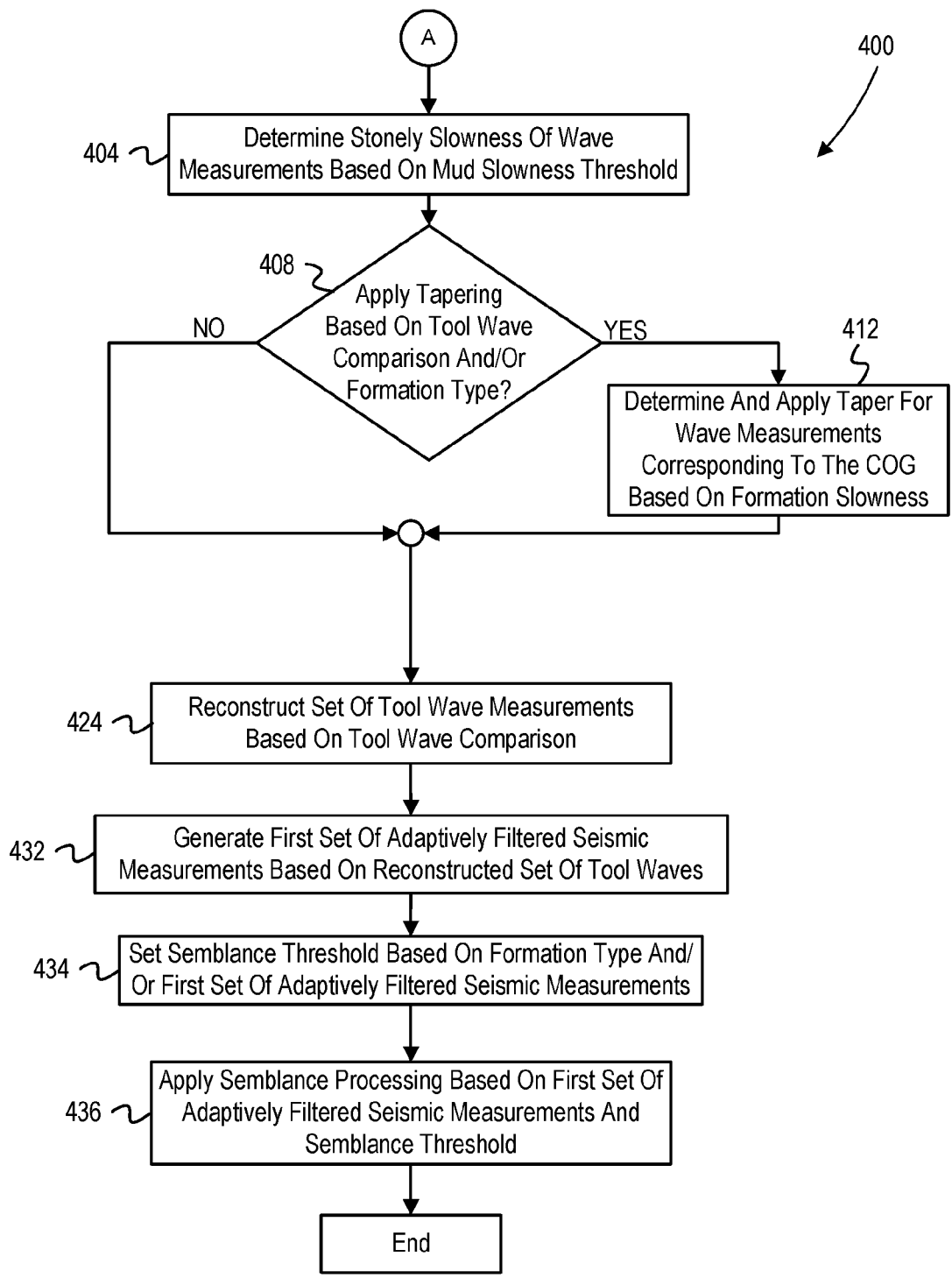
FIG. 4 depicts a continuation of the flowchart of operations of FIG. 3 to apply an adaptive filter to subsurface wave measurements.

FIG. 4 depicts a continuation of the flowchart of operations of FIG. 3 to apply an adaptive filter to subsurface wave measurements. FIG. 4 depicts a flowchart 400 of operations that are described in reference to a system comprising a processor. Operations of the flowchart 400 continue at block 404 from the operations of FIG. 3.

At block 404, the Stoneley slowness of wave measurements are determined based on a mud slowness threshold. In some embodiments, Stoneley slowness can be measured by isolating the contribution of Stoneley waves in the COG or by a time slowness semblance processing in a common transmitter gather (CTG). Once the Stoneley wave measurements are isolated, the Stoneley wave slowness can be determined. The formation property might be predicted by comparing a measured or approximated Stoneley wave slowness with a mud slowness threshold, wherein the mud slowness threshold can be based on known slowness values of waves propagating through a fluid. In some embodiments, this Stoneley slowness comparison can be used when determining whether the formation type is fast or slow. For example, if the Stoneley slowness cannot be measured or is much greater than a mud slowness threshold (e.g. greater by at least 10%), then the formation type can be classified as a slow formation (e.g. a soft formation). Otherwise, the formation type can be classified as a fast formation.

At block 408, a determination is made of whether to apply a taper based on a tool wave comparison and/or a formation type. With reference to FIG. 3, the tool wave comparison can be the comparison of the local tool wave predictions and the tool wave template described for block 320. A taper can be generated to reduce complications from using a significant semblance peaks/events in the semblance map. In some embodiments, the system can determine that a taper should be applied based on a DTC being slower than $DT_{tool}$. Subsurface wave measurements of slow formations determined to have a faster tool wave than a formation compression wave can include residual tool wave measurements that are not removed during pre-filtering. A system can apply a taper to filter out residual tool wave measurements that are not removed during pre-filtering. For example, with reference to FIG. 3, if the comparison at block 320 results in the determination that the comparison value exceeds the formation-to-tool threshold, then the DTC is greater than or equal to $DT_{tool}$ by at least k units of slowness. In response, the system can determine that formation compression waves are slower than tool waves and that a taper should be applied.

In addition, some embodiments can determine that a taper should be applied based on a formation type. For example, the system can determine that a taper should be applied based on the formation type being a soft/slow formation type. In some embodiments, the formation type identified using the Stoneley slowness analysis described above at block 404 can be used. Alternatively, the formation type can be identified using other measurements, such as measurements from mineralogical tests of core samples, chemical analysis, resistivity tests, etc. In some embodiments, the system can determine that a taper should be applied when both the formation type is determined to be slow and the formation compression waves is determined to be slower than tool waves. Otherwise, the system can determine that a taper should not be applied. If the system determines that a taper should be applied, operations of the flowchart 400 proceed to block 412. Otherwise, operations of the flowchart 400 proceed to block 416.

At block 412, the system determines and applies the taper for wave measurements corresponding to the semblance map of an array waveforms based on the formation slowness. The taper can be used to reduce measurement artifacts and can be determined based on the formation slowness by generating a function representing a taper between a peak value to a background value. For example, the system can use a taper function that varies as a function of wave slowness and apply this taper function to the set of subsurface wave measurements to filter out tool wave measurements.

At block 424, the system reconstructs a set of tool wave measurements based on the tool wave comparison. For example, the tool wave ratio r and formation-to-tool threshold $r_{th}$ from Equations 1-2 can be used in the following Equations 3 and 4, where a represents a proportion of the tool wave template in the final estimated tool wave measurements, MAX is a maximum value function, $\text{Wav}_{TL}^{local}$ represents the wave value contribution of a local tool wave, $Wav_{TL}^{global}$ represents the wave value contribution of a tool wave template, and $Wav_{TL}$ represents a reconstructed tool wave measurement:

$$a = \frac{MAX(r, r_{th}) - r_{th}}{MAX(r, r_{th}) - r_{th} + 1} \quad \text{Eq. 3}$$

$$Wav_{TL} = (1-a)Wav_{TL}^{local} + aWav_{TL}^{global} \quad \text{Eq. 4}$$

In cases where the formation compression waves are slower than the tool waves, the system can increase the accuracy of the reconstructed tool wave measurements by applying an additional filter to keep tool wave arrivals. For example, the system can apply a F-K filter as shown below in Equation 5, wherein FK represents the F-K filter function, $Wav_{TL}$ represents a reconstructed tool wave measurement, and $Wav_{modified-TL}$ represents a modified reconstructed tool wave measurement, which is modified to account for the formation compression waves being slower than the tool waves:

$$Wav_{modified-TL} = FK(Wav_{TL}) \quad \text{Eq. 5}$$

Alternatives to the binomial weighting shown in Equation 4 and its corresponding proportionality factor a can be used (e.g. determining a reconstructed tool wave measurement based on mathematical differences, logarithmic comparisons, etc.). In addition, the system can apply other filters to the wave measurements (e.g. median filter, Radon transform-based filter, etc.) can be used to generate the enhanced estimated tool wave measurement.

At block 432, the system generates a first set of adaptively filtered subsurface wave measurements based on the reconstructed set of tool waves. With reference to FIG. 3, the adaptively filtered subsurface wave measurements can be determined by subtracting wave values based on the reconstructed tool wave measurement from the first set of subsurface wave measurements. The wave values can be equal to the reconstructed tool wave measurements described above at block 424. Alternatively, the wave values based on the reconstructed tool wave measurements can be the result of applying one or more filters to the reconstructed tool wave measurements. For example, the adaptively filtered subsurface wave measurements can be generated using Equation 6 below, wherein the adaptively filtered subsurface wave measurements $Wav_{initial-AF}$ are determined based on the first set of subsurface wave measurements $Wav_{first}$ and the modified reconstructed tool wave measurement $Wav_{modified-TL}$:

$$Wav_{initial-AF} = Wav_{first} - Wav_{modified-TL} \quad \text{Eq. 6}$$

In addition to, the system may remove other non-tool modes using a filter for a common transmitter gather (CTG). A filter for a CTG can filter subsurface wave measurements such that each subsurface wave measurement in the first set of adaptively filtered subsurface wave measurements comes from a common transmitter. For example, a transmitter can be known to transmit at a certain frequency and amplitude at a certain time interval. By tracking the frequencies and amplitudes of subsurface wave measurements over time, the system can apply a filter to determine which of the subsurface wave measurements correspond with the transmitter frequency/amplitude and filter out at least a subset of subsurface wave measurements that do not correspond with the transmitter.

At block 434, the system sets a semblance threshold based on the formation type and/or the first set of adaptively filtered subsurface wave measurements. The peak threshold can be determined based on a pre-set value responsive to the formation type. For example, the peaks in a first set of peaks can be normalized to a numeric scale between zero and one, and the peak threshold can be set at a pre-set value of 0.3 for soft formation types. Alternatively, or in addition, the semblance threshold can be determined based on a set of peaks corresponding to the first set of adaptively filtered subsurface wave measurements. In some embodiments, the system can determine a semblance threshold to be proportional to a statistic (e.g. an arithmetic mean, median, standard deviation, etc.) of the set of peaks. For example, the semblance threshold can be determined to be half of the standard deviation of semblance values corresponding to the set of peaks.

At block 436, the system applies semblance processing based on the first set of adaptively filtered subsurface wave measurements and the semblance threshold. The semblance processing can include various monopole LWD processing methods such as the slowness-time-coherence (STC) method, Nth-Root method, and the Differential-Phase-Time-Semblance (DPTS) method. For example, a DPTS method can be used. The DPTS method can be used with a slowness-time mask, wherein the selection region defined by the slowness-time mask is determined by a set of points on the slowness-time mask. The system can set the points of the slowness-time mask. For example, a slowness-time mask can be a quadrilateral defined by four points, wherein the travel times used to determine the point positions can be found in equation 7 below, where $Z_f$ is a propagating distance in the formation, $Z_f s$ is a propagating delay in the formation, $L_{mud}$ is the propagating path in the mud, $s_{mud}$ is the mud slowness, $L_{mud}s_{mud}$ is the travel time in the borehole, $TT_{pulse}$ is a pulse delay, and TT is the travel time of a mode having a speed s, wherein modifying the value of s from a minimum value to a maximum value sets the boundary travel times of a slowness-time mask:

$$TT = Z_f s \pm + L_{mud}s_{mud} + TT_{pulse} \quad \text{Eq. 7}$$

In some embodiments, the slowness-time mask provides a means of filtering peaks by restricting peak selection to a selection region specified by the slowness-time mask in the DPTS map, wherein each peak in the selection region represents a possible mode propagating with the slowness associated with the peak. The DPTS map can include semblance information about a peak such as the peak semblance value, the slowness corresponding to the peak, boundary travel times of the peak, arrival time of the peak, etc. In addition, indicators of the quality of the DPTS map can be provided, wherein the quality of the DPTS map can include a peak separation value, a ratio of peak value to background semblance value, etc. In addition, formation wave values such as amplitude and frequency can be provided by either the DPTS map or the subsurface wave measurements corresponding with the peak in the DPTS map. Furthermore, the system can use various other methods to identify peaks in the DPTS map, such as moving a semblance window using operations further described below for flowchart 500 of FIG. 5.

Figure 5:
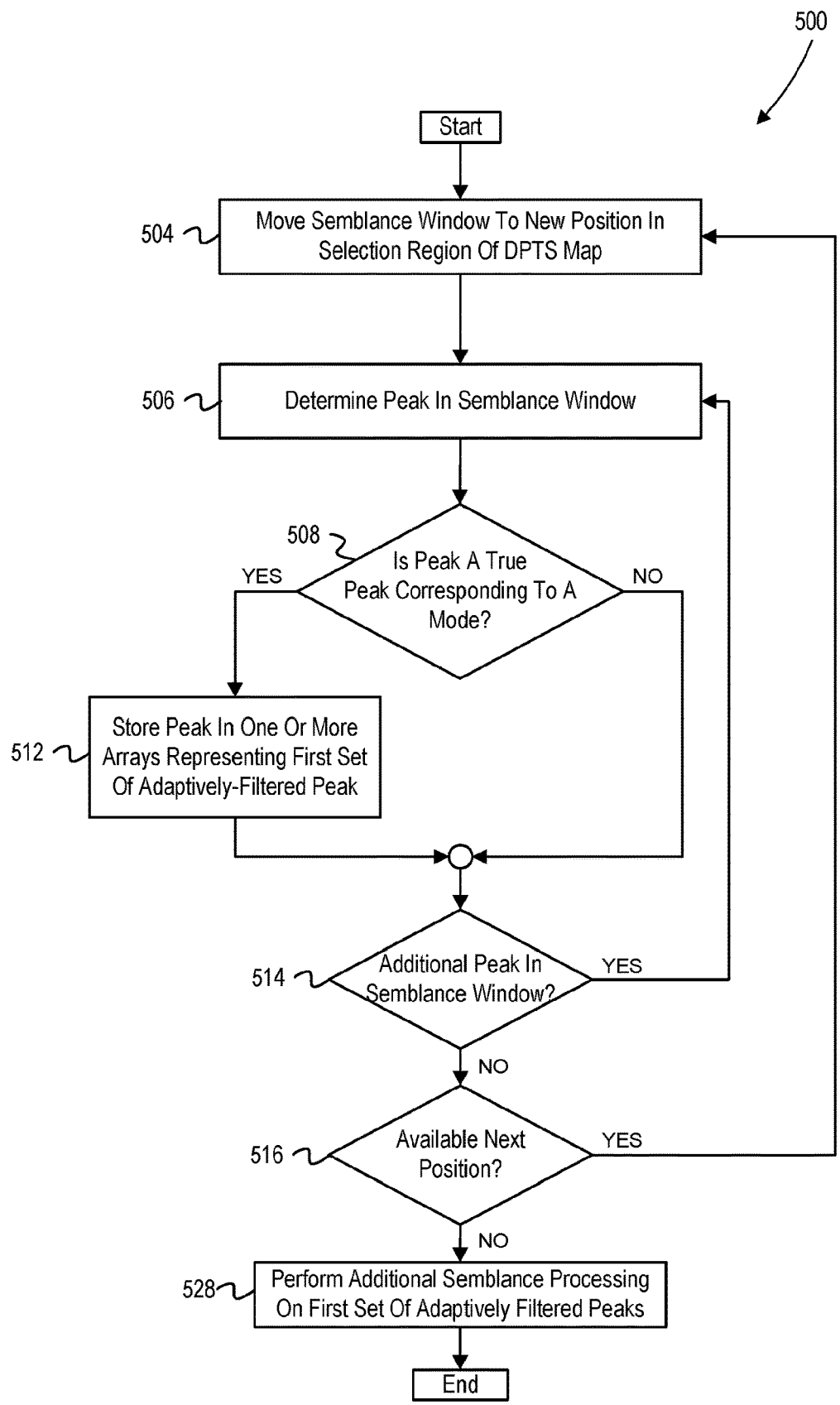
FIG. 5 depicts a flowchart of operations to determine one or more peaks in a (differential phase time semblance) DPTS map using a slowness-time mask.

FIG. 5 depicts a flowchart of operations to determine one or more peaks in a (differential phase time semblance) DPTS map using a slowness-time mask. With further reference to FIG. 4 above, FIG. 5 is a flowchart 500 of operations that can be performed as a part of semblance processing discussed above for block 436. Operations of the flowchart 500 start at block 504.

At block 504, the system moves a semblance window to a new position in a selection region of a differential-phasetime-semblance (DPTS) map. With reference to FIG. 4, the DPTS map can be generated based on the semblance processing performed at block 436. The selection region can be defined by a slowness-time mask of the DPTS map as described above.

In some embodiments, a minimum slowness of the selection region can correspond with the minimum predicted travel time $TT_{sMIN}$, and a maximum slowness of the of the selection region can correspond with the maximum predicted travel time $TT_{sMAX}$. The system can use a time window that captures the coherence event of modes to account for the heterogeneity of the measured formation. A set of example minimum starting slowness time $TT_{sMIN}^{start}$, minimum ending slowness time $T_{sMIN}^{end}$, maximum starting slowness time $TT_{sMAX}^{start}$, and maximum ending slowness time $T_{sMAX}^{end}$ can be determined as shown below in Equations 8-11:

$$TT_{sMIN}^{start} = TT_{sMIN} * 0.9 - 100 \quad \text{Eq. 8}$$

$$T_{sMIN}^{end} = TT_{sMIN} * 1.45 + 400 \quad \text{Eq. 9}$$

$$TT_{sMAX}^{start} = TT_{sMAX} * 0.8 - 300 \quad \text{Eq. 10}$$

$$T_{sMAX}^{end} = TT_{sMAX} * 1.40 \quad \text{Eq. 11}$$

At block 506, the system determines a peak in the semblance window. The peak in the semblance window can be determined based on a maximum value and/or a differential value. For example, the system can analyze a semblance window to determine one or more maximum values in the semblance window and label the point in the semblance window as a peak.

At block 508, the system determines whether the peak is a true peak corresponding to a mode. The system can determine that the peak is a true peak corresponding to a mode based on whether or not the peak satisfies (e.g. is greater than) a semblance threshold. For example, if a semblance threshold is 0.5 and the density value of a peak is 0.8, then the system can determine that the peak is a true peak corresponding to a mode. With respect to FIG. 4 above, the semblance threshold can be the same as or similar to the semblance threshold described for block 434. If the peak does not satisfy the semblance threshold, the system can determine that the peak is not a true peak.

At block 512 the peak is stored in one or more arrays representing a first set of adaptively filtered peaks. In some embodiments, the peak can be stored with its corresponding travel time and can be tracked using the travel time directly associated with the peak. In some embodiments, additional travel times can be assigned to the peak or its corresponding mode using the boundary values of the peak, wherein the boundary values are determined based on a consistent standard. For example, a peak on a DPTS map can have a slowness of 100 microseconds per foot and a travel time 1000 microseconds. If a peak boundary threshold is 0.25 of the peak density, the boundary values of the peak can have a travel time lower bound of 850 microseconds and travel time upper bound 1200 microseconds, wherein both the lower and upper bound are at the same slowness as the peak. The one or more arrays can be stored in a non-transitory machine readable medium. For example, each peak of a set of peaks and their corresponding peak boundary values can be stored in a multi-dimensional array in a system memory.

At block 514, the system determines if there is an additional peak in the semblance window. If there is another available peak in the semblance window, the system will return to operations disclosed at block 506 to analyze the next available peak. Otherwise, operations of the flowchart 500 can continue at block 516.

At block 516, the system determines if there is an available next position for the semblance window. If there is an available next position for the semblance window, the system can return to block 506, wherein the system will move the semblance window to the next position. Otherwise, operations of the flowchart 500 can continue at block 528.

At block 528, the system performs additional semblance processing operations on the first set of adaptively filtered peaks. The additional semblance processing operations can include operations of flowchart 600 shown in FIG. 6. After semblance processing operations are complete, the system can end the operations described in flowchart 500.

Figure 6:
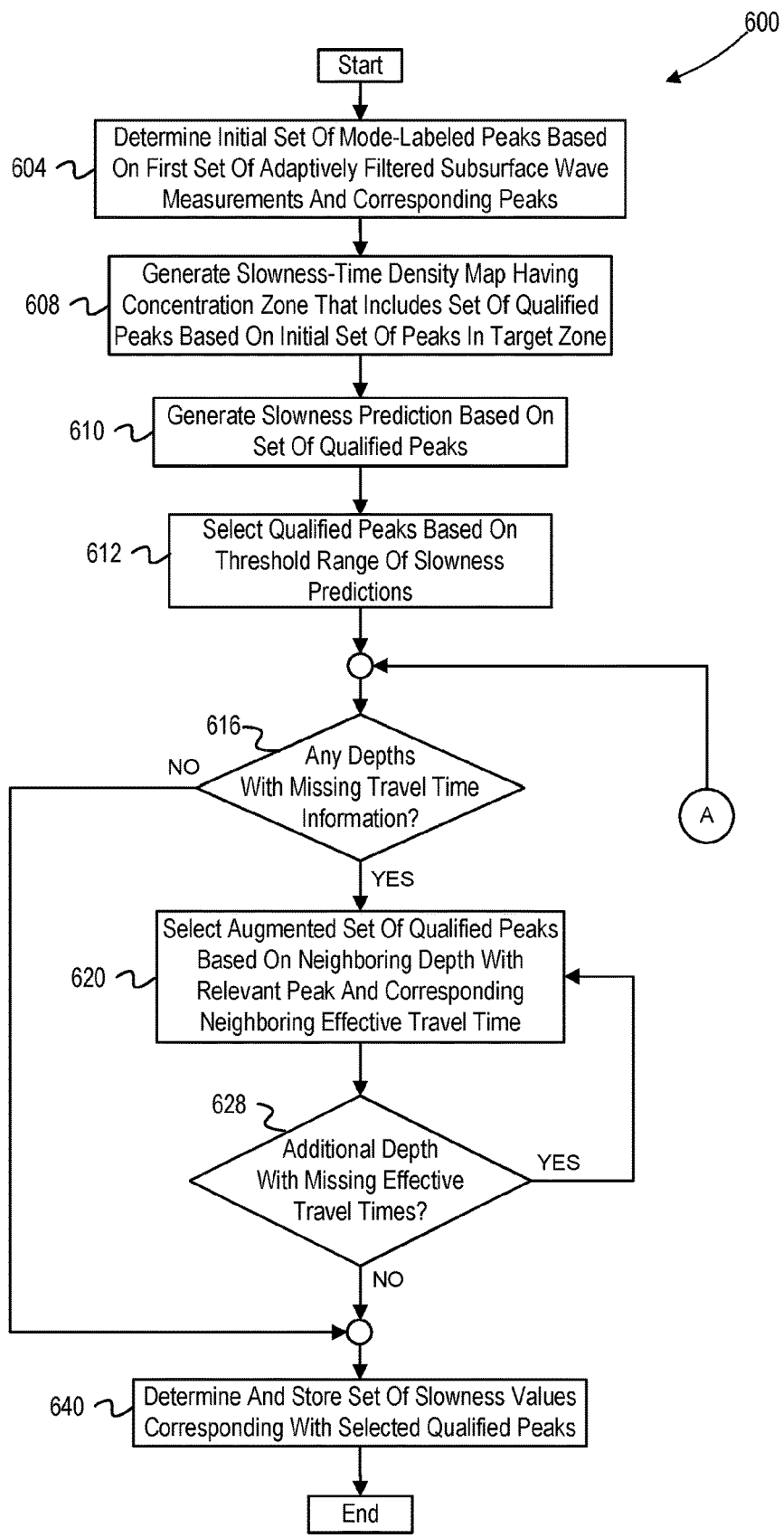
FIG. 6 depicts a flowchart of operations to identify formation waves and their travel times.

FIG. 6 depicts a flowchart of operations to identify formation waves and their travel times. With further reference to FIGS. 4 and 5 above, FIG. 6 is a flowchart 600 of operations that can be performed as a part of semblance processing discussed above for blocks 436 and 528 respectively. Operations of the flowchart 600 are described with reference to a system comprising a processor and start at block 604.

At block 604, the system determines an initial set of mode-labeled peaks based on a first set of adaptively filtered subsurface wave measurements and their corresponding peaks. The initial set of mode-labeled peaks can be determined by identifying which of the first set of adaptively filtered peaks are the first arrived peaks over a semblance threshold that correspond with a mode (e.g. compression, shear, etc.). For example, an initial set of mode-labeled peaks can be an initial set of compression wave peaks or an initial set of shear wave peaks. With further respect to FIG. 5, operations to determine the initial set of mode-labeled peaks can be based on the adaptively filtered peaks discussed at block 512 for determining one or more DTC values. Alternatively, with respect to FIG. 7, operations to determine the initial set of shear wave peaks can be based on shear-specific adaptively filtered peaks similar to or the same as those discussed at block 712 for determining one or more DTRS values. In some embodiments, the system can use a first semblance threshold to identify a peak corresponding with a compression wave and use a second semblance threshold to identify a peak corresponding with a formation shear wave. For example, the first arrived peaks of a set of adaptively filtered subsurface wave measurements above a compression wave semblance threshold can be identified as corresponding to the formation P-arrival (i.e., time of arrival for the first P-wave), and the first arrived peaks of shear-specific adaptively filtered subsurface wave measurements above a shear wave semblance threshold can be identified as corresponding to the formation S-arrival (i.e., time of arrival for the first S-wave).

At block 608, the system generates a slowness-time density map having a concentration zone that includes a set of qualified peaks based on the initial set of mode-labeled peaks. A slowness time density map can be used to track compression and shear waves based on their wave slowness values and travel times. For example, this tracking can be performed within a range determined based on Equations 12-14 below, where T represents the travel time, S represents slowness, $\rho_T(S)$ represents slowness density for an initial travel time (e.g. DTC or DTRS) in a set of multi-depth measurements, Semb represents a semblance value of the first guesses, $T_{thr}$ and $S_{thr}$ denotes the thresholds for computing the travel time density and slowness time density, and STD(T, S) represents values on the slowness-time density map:

$$\rho_T(T) = \sum_{|T_{peak}-T|<T_{thr}} Semb(T_{peak}) \qquad \text{Eq. 12}$$

$$\rho_T(S) = \sum_{|S_{peak}-S|<S_{thr}} Semb(S_{peak}) \qquad \text{Eq. 13}$$

$$STD(T, S) = \rho_T(T)\rho_s(S) \qquad \text{Eq. 14}$$

Equations 12-14 show that the summation of the semblance values in a specific range around a peak time can be calculated as a density value for the center position of the range. By applying Equations 12-14 for each of the initial set of mode-labeled peaks, the system can generate a slowness-time density map. In addition, the system can set a concentration zone that includes the set of qualified peaks, wherein the boundaries of the concentration zone are within a range of the initial set of mode-labeled peaks. For example, the system can set a slowness lower bound of the concentration zone to be 100 microseconds per foot greater than the slowest measurement of the initial set of shear wave peaks or set a travel time upper bound of the concentration to be 100 microseconds less than the fastest measurement of the initial set of shear wave peaks.

At block 610, the system generates a slowness prediction based on the set of qualified peaks in the concentration zone. The system can generate a slowness prediction in the form of a slowness prediction curve, wherein the prediction curve is a function fitted to the qualified peaks (e.g. compression wave peaks, shear wave peaks, etc.). For example, the system can generate a fitted parabolic function to be a compression wave slowness prediction curve for a set of qualified compression wave peaks. As an alternate example, the system can generate a fitted hyperbolic function to be a shear wave slowness prediction curve based on a set of qualified shear wave peaks (i.e. peaks corresponding with a shear mode). Alternatively, the system can generate other functions fitted to the set of qualified peaks, such as a polynomial function, linear interpolation function, exponential function, etc.

At block 612, the system selects the set of qualified peaks based on a threshold range of the slowness prediction. The system can select the set of qualified peaks by starting with the set of qualified peaks described above at block 608 and augmenting this set with additional peaks within a threshold range of the slowness prediction. The threshold range of slowness predictions can be determined based on the slowness-time density map and/or one or more corresponding sets of qualified peaks. In some embodiments, an acceptable slowness threshold $S_{TH}$ can be used to augment a set of peaks in the slowness-time density map with peaks that are within the acceptable slowness threshold $S_{TH}$ of a prediction curve. The above condition for selecting a set of peaks can be written in the form of Equation 15 below, wherein max{Sem($s_{peak}$)} represents the procedure of taking the slowness peak with the maximum semblance value, $S_{peak}$ represents the slowness for all peaks in a variable-density log (VDL) map (e.g. a VDL map generated based on mechanical wave measurements), $S_{pred}$ represents the slowness prediction based on a prediction curve value at an index value corresponding with $S_{peak}$, and $S_{TH}$ is the acceptable slowness threshold:

$$\max\{Sem(s_{peak})\} \text{ and } |S_{peak}-S_{pred}|<S_{TH} \qquad \text{Eq. 15}$$

At block 616, the system determines if there are depths missing an effective peak, slowness (Delta-T) or travel time. A depth can be without an effective slowness (e.g. either a DTC or a DTRS) in cases where high measurement noise or low axial resolution prevent the detection of a wave peak and its corresponding slowness. If the system determines that a depth is without an effective slowness, operations of the flowchart 600 proceed to block 620. Otherwise, operations of the flowchart 600 proceed to block 640.

At block 620, the system selects an augmented set of qualified peaks based on a neighboring depth with a relevant peak and corresponding neighboring effective travel time. The system selects an augmented set of qualified peaks by tracking peaks based on their neighboring effective travel time and filling in the missing effective travel time. The system can find a neighbor depth having an effective travel time by selecting a measurement depth near the depth that is missing an effective travel time value, where the selected depth has the travel time information. The system can then track the peaks having a similar travel time (within a travel time threshold) as the neighbor depth to determine an effective travel time. To determine a searching range within which a peak and corresponding effective travel time can be tracked, the system can use the limits defined by Equation 16 below, where $TT_i^{START}$ is a starting time of a mode at index i and $TT_i^{end}$ is the ending time of a mode at the index i, wherein the index i correlates with at least one of a depth or a measurement shot of a multi-shot measurement system:

$$\left|\frac{TT_i^{start}+TT_i^{end}}{2} - \frac{TT_{i-1}^{start}+TT_{i-1}^{end}}{2}\right| < \frac{TT_{i-1}^{end}-TT_{i-1}^{start}}{2} \qquad \text{Eq. 16}$$

Once the effective searching range is determined, peaks that are closest to the selected peak corresponding to the previous value of i (e.g. a previous depth or previous shot) are selected as the final estimate of the peak. The corresponding $TT_i^*$ of this final estimate can be assigned as the effective travel time to fill in for the missing effective travel time. Also, the corresponding slowness of this final estimated peak can be assigned as the effective DTC or DTRS to fill in for the missing slowness in the zone.

At block 628, a determination is made of whether there are additional depths with missing slowness estimates. If there are additional depths with a missing effective slowness, the system can proceed to operations disclosed at block 620 to determine an effective slowness for these additional depths.

At block 640, the system determines and stores the set of slowness values corresponding with the selected set of qualified peaks. The system can store the slowness values by storing the slowness values themselves, their corresponding peaks, and/or other information corresponding with the slowness values, such as the wave travel times. The system can store the set of slowness values in a non-transitory machine readable medium. For example, a first set of peaks corresponding with DTC values and a second set of peaks corresponding with DTRS values can be stored in a set of arrays accessible in a system memory.

Figure 7:
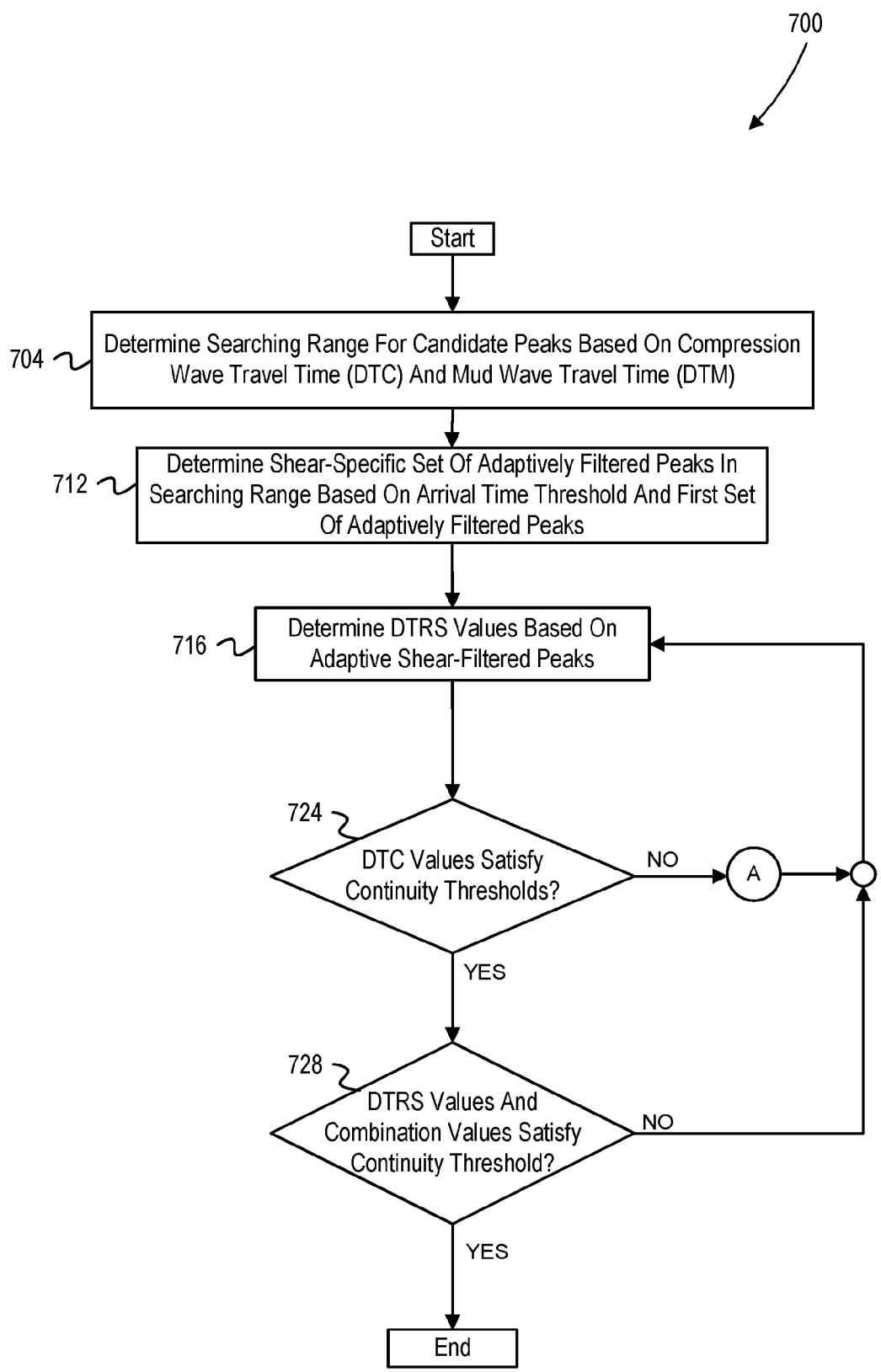
FIG. 7 depicts a flowchart of operations to apply a shear-specific adaptive filter to a set of wave measurements to identify one or more shear waves.

FIG. 7 depicts a flowchart of operations to apply a shear-specific adaptive filter to a set of wave measurements to identify one or more shear waves. With further reference to FIG. 4 above, FIG. 7 depicts a flowchart 700 of operations that can be performed as a part of semblance processing discussed above for block 436. Operations of the flowchart 700 are described with reference to a system comprising a processor and start at block 708.

At block 704, the system determines a shear searching range for candidate shear peaks based on a DTC, and a mud wave slowness (DTM). With reference to FIG. 6, the DTC values can be determined using operations similar to or the same as those disclosed for the flowchart 600. The DTM values can be determined based on empirical mud slowness equations, tabulated data, or theory-based fluid properties. The shear searching range can be split into a lower bound and an upper bound. The lower bound can be determined based on the DTC. For example, a lower bound $s_{low}^s$, can be determined based on the DTC semblance value $s_p$ and a compression to shear (P-S) ratio minimum value $r_{ps}$ using Equation 17 below:

$$s_{low}^s = s_p * r_{ps} \quad \text{Eq. 17}$$

The shear slowness upper bound can be determined based on the DTM. For example, the shear slowness upper bound $s_{high}^s$ can be determined based on the mud compression wave slowness $s_{mud}$ (DTM) using Equation 18 below:

$$s_{high}^s = s_{mud} \quad \text{Eq. 18}$$

At block 712, the system selects the set of shear-specific adaptive peaks from a first set of adaptively filtered peaks in the shear searching range based on one or more arrival time thresholds. With reference to FIG. 5, the first set of adaptively filtered peaks can be determined based on the operations described the flowchart 500. In some embodiments, the arrival time thresholds can be the bounds of the shear searching range described above for block 708. The system can also filter out additional peaks based on additional pre-determined arrival time thresholds. In some embodiments, the system can set a first arrival time threshold to a value less than a first set of non-shear formation waves and filter out peaks having an arrival time greater than the first arrival time threshold. Alternatively, or in addition, the system can set a second arrival time threshold to a value greater than the arrival times of a second set of non-shear formation waves and filter out peaks having arrival times less than the second arrival time threshold. Non-shear formation waves can include mud compression waves, leaky-P waves, and PR-Rayleigh waves.

At block 716, the system determines a set of DTRS values based on the shear-specific adaptively filtered peaks. With reference to FIG. 6, the system can apply the operations disclosed above for the flowchart 600, wherein the adaptively filtered peaks can be used as the shear-specific adaptively filtered peaks to determine the DTRS values described in the description for block 640.

At block 724, the system determines whether the DTC values satisfy one or more continuity thresholds. The system can determine that the DTC values are continuous based on the DTC values satisfying the one or more continuity thresholds. For example, to determine continuity, a first DTC value can be determined to not be continuous based on the first DTC value or its corresponding travel time curve exceeding a continuity threshold of 10% of neighboring depth values. In some embodiments, a non-continuous DTC value can be determined to have jumped into a DTRS region based on continuity thresholds such as an expected DTRS range. For example, the system can determine that the DTC value has jumped into a DTRS region based on a continuity of the slowness value or corresponding travel time curves being within an expected DTRS range. With further reference to FIG. 6, if the system determines that a DTC value jumps to a DTRS region, the system can re-assign the corresponding DTC peak as a DTRS peak and then re-determine one or more DTC values at block 616 before returning to block 716.

At block 728, the system determines whether the DTRS values and combination values satisfy one or more continuity thresholds. A combination value can be a value determined based on both DTC values and DTRS values. For example, a combination value can be a ratio of a DTC value to a DTRS value. The DTRS and combination values can satisfy some continuity thresholds when each of the DTRS values and combination values are continuous within a slowness change threshold and travel time change threshold. For example, if a slowness change threshold was 15 microseconds per foot between any neighboring depths/indices and a DTRS value showed a slowness change of 20 microseconds per foot between two neighboring indices, the slowness change would be greater than the slowness change threshold and the DTRS would not satisfy the continuity threshold. The system can also determine whether the DTRS values and combination value satisfy continuity thresholds by determining whether the ratio of a DTRS value to a DTC value satisfies physical law thresholds. For example, the system can determine that the DTRS to DTC ratio value is within 1.5 and 3.3 to satisfy a physical law threshold and that the DTRS to DTC ratio value does not satisfy the physical law threshold otherwise. In addition, the system can determine whether a DTRS value has jumped to a DTC region, wherein the DTC region can be based on continuity thresholds such as an expected DTC range. The system can determine that the DTRS values do not satisfy a continuity threshold based on the DTRS values having jumped to a DTC region.

If one or more of the DTRS values or combination values do not satisfy the continuity threshold, the system returns to block 716 to perform another slowness-arrival time analysis with different initial threshold/other values and re-calculate the DTC and/or DTRS values. In some embodiments, if one or more DTRS values is determined to have jumped to a DTC region, the system assign the one or more jumped DTRS peaks as DTC peaks before proceeding to block 716. Otherwise, operations of the flowchart 700 can be complete and the final DTRS and DTC values can be used as the shear wave slowness and compression wave slowness values, respectively.

The flowcharts above are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 504-516 of FIG. 5 can be performed in parallel or concurrently. With respect to FIG. 6, determining and augmenting peaks is as disclosed in blocks 616-628 is not necessary. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Example Data

Figure 8:
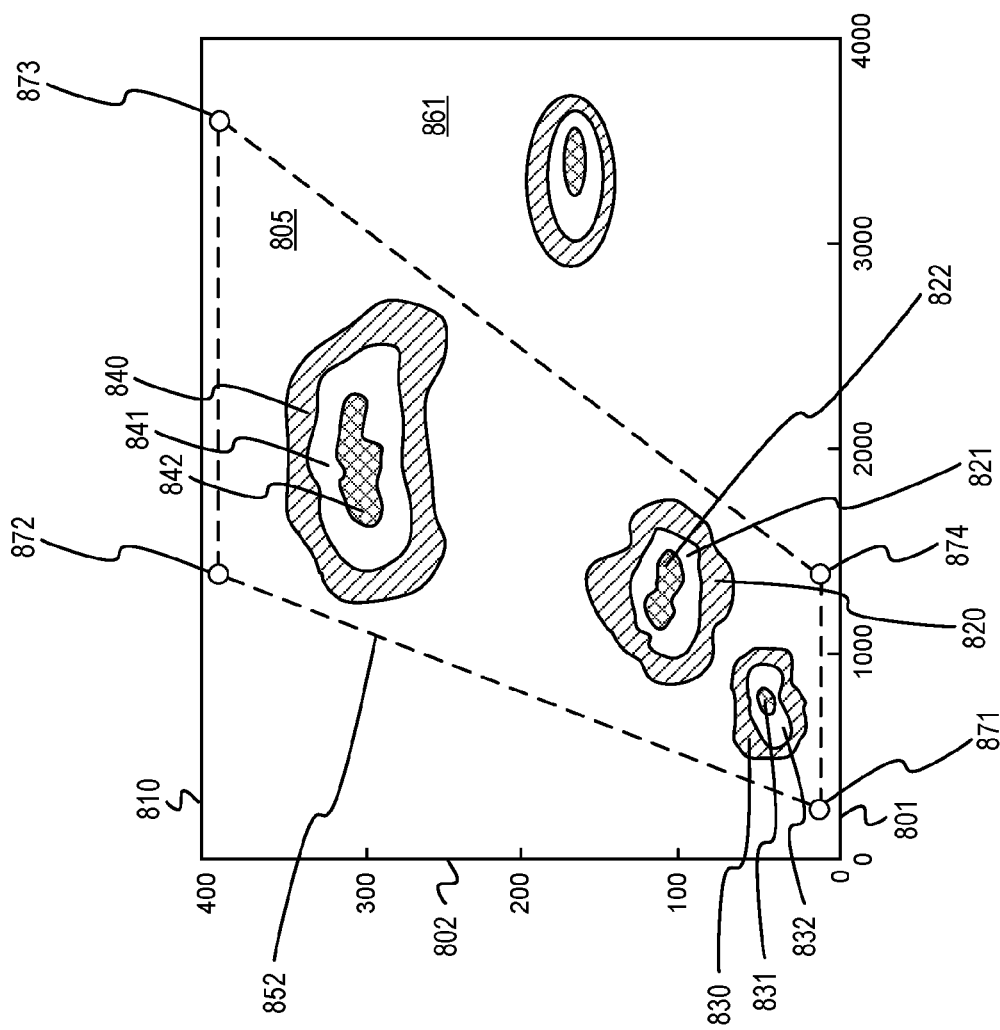
FIG. 8 depicts an example DPTS map with a slowness-time mask.

FIG. 8 depicts an example DPTS map with a slowness-time mask. The DPTS map 810 has a horizontal axis 801 representing time in microseconds and a vertical axis 802 representing slowness in microseconds per foot. The baseline density region 805 represents a region wherein each of the slowness-time density values are less than a slowness-time density threshold $L_0$. A set of separated regions in the DPTS map 810 each represent a region separated from the baseline density region 805 by slowness-time density thresholds $L_0$, $L_1$, and $L_2$ wherein $L_0$<$L_1$<$L_2$. Lower elevated regions 820, 830, and 840 represents regions wherein the slowness-time density values are greater than or equal to $L_0$. Middle elevated regions 821, 831, and 841 represents regions wherein the slowness-time density values are greater than or equal to $L_1$. The upper elevated regions 822, 832, and 842 represent regions wherein the slowness-time density values are greater than or equal to $L_2$.

An adaptive filter can include the use of a slowness-time mask 852 to select peaks in a selection region surrounded by the slowness-time mask 852 and avoid peaks in the non-target region 861. With respect to FIG. 4, the slowness-time mask 852 can be generated using operations similar to or the same as those disclosed for block 436 to determine the region-defining points 871-874. The upper elevated regions 822, 832, and 842 are each inside of the slowness-time mask 852 and can include at least one peak density value. The peaks inside of the upper elevated regions 822, 832, and 842 can correspond with a DTC or DTRS. For example, one or more peaks inside of the upper elevated regions 822 can correspond with a DTRS and one or more peaks inside of the upper elevated regions 832 can correspond with a DTC.

Figure 9:
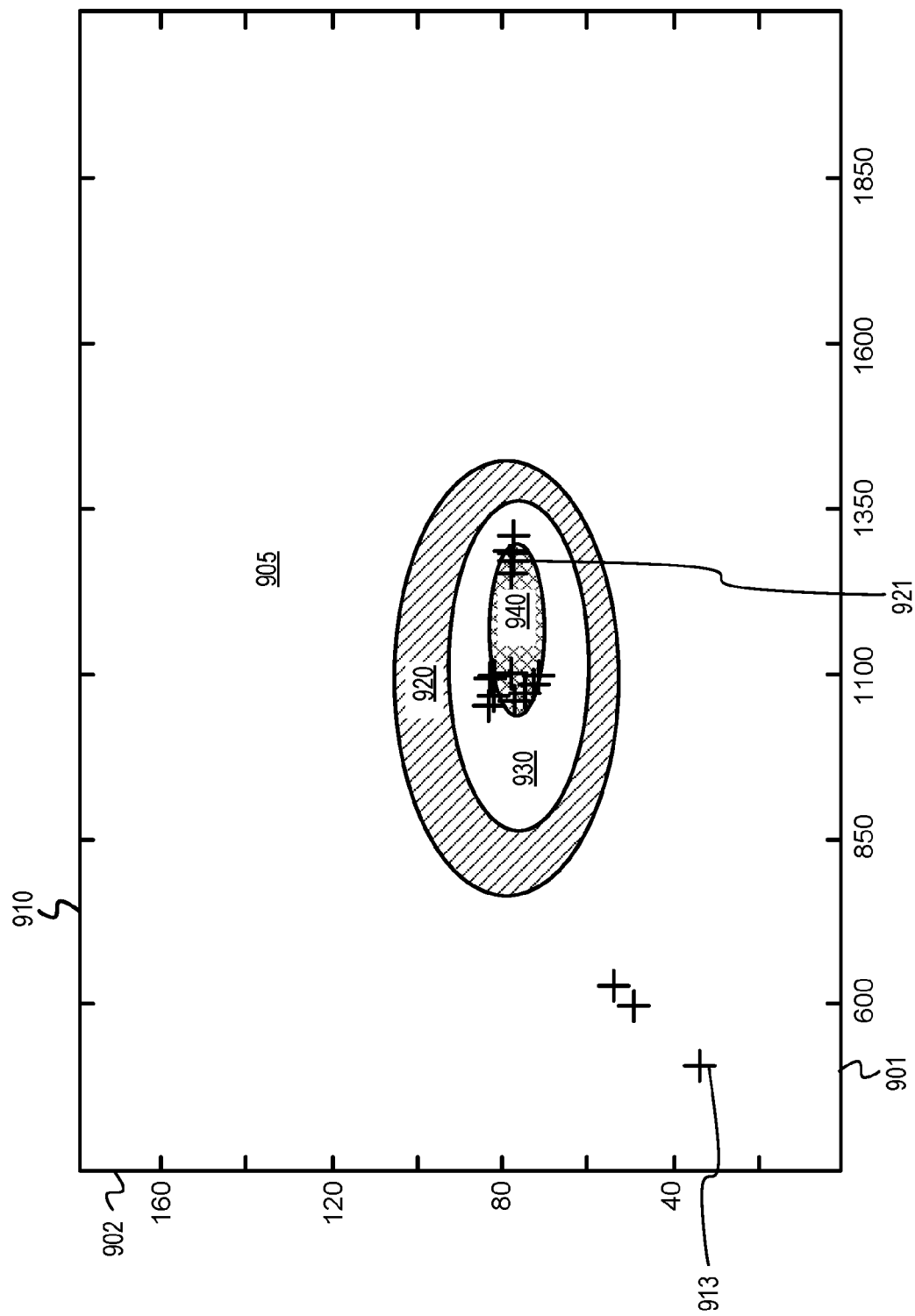
FIG. 9 depicts an example slowness-time density (STD) map and qualified peaks corresponding with a compression mode.
Figure 10:
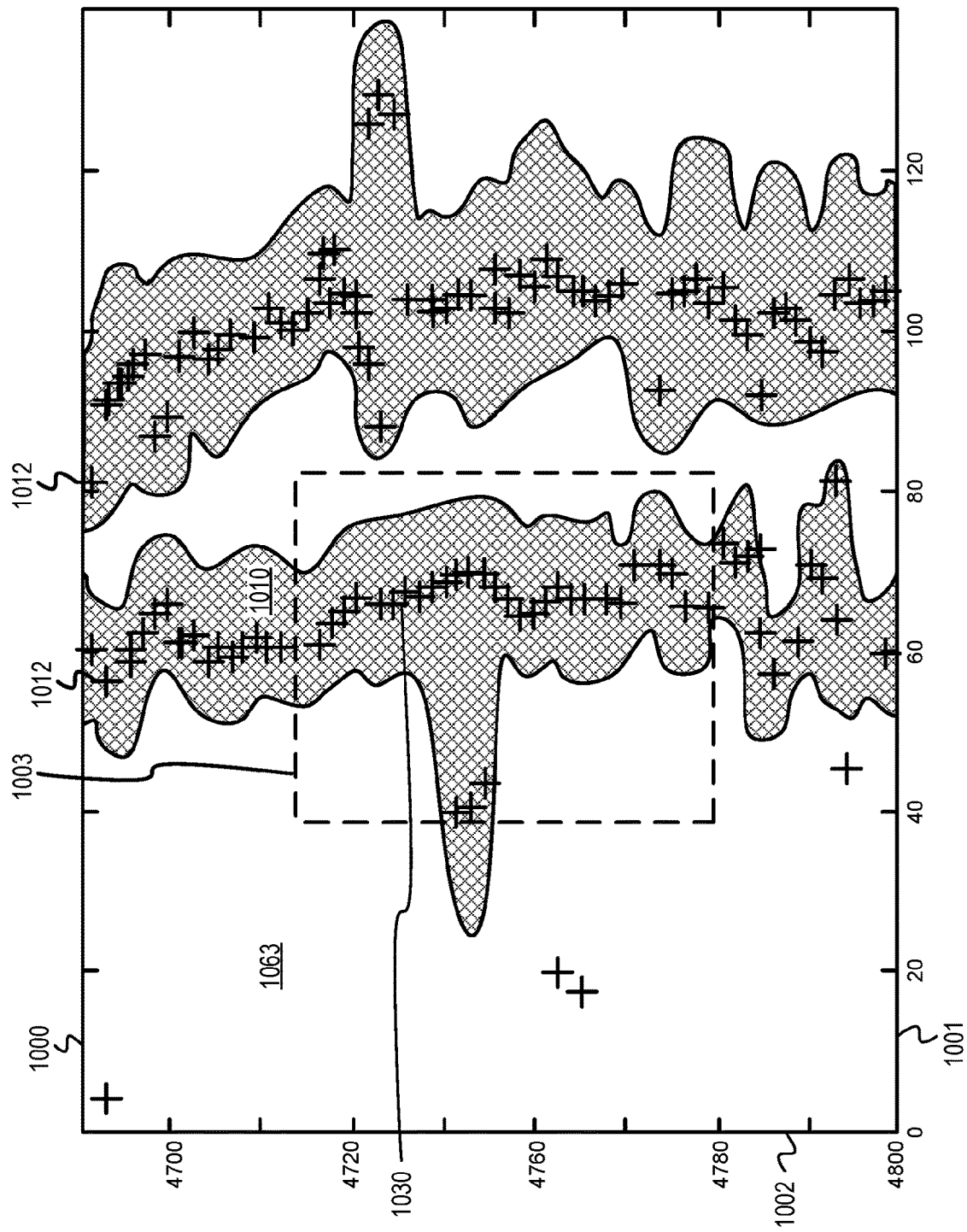
FIG. 10 depicts density measurements of an example variable-density log (VDL) and their corresponding peaks at various depths.

FIG. 9 depicts an example slowness-time density (STD) map and qualified peaks corresponding with a compression mode. The STD map 910 has a horizontal axis 901 representing time in microseconds and a vertical axis 902 representing slowness in microseconds per feet. The STD map 910 shows slowness-time density value ranges split into a set of regions. The baseline density region 905 represents a region wherein each of the slowness-time density values are less than a slowness-time density threshold $R_0$. Regions 920, 930, and 940 each represent a region greater than the baseline density region 905 by the slowness-time density thresholds $R_0$, $R_1$, and $R_2$ wherein $R_0$<$R_1$<$R_2$. The region 920 represents a region wherein the slowness-time density values are greater than or equal to $R_0$. The region 930 represents a region wherein the slowness-time density values are greater than or equal to $L_1$. The region 940 represents a region wherein the slowness-time density values are greater than or equal to $L_3$ With reference to FIG. 4, a semblance threshold described for block 434 can be set and applied to determine a concentration zone for which an initial set of mode-labeled peaks is determined. For example, the semblance threshold can be set to the density threshold $R_1$, which would set the region 930 as a concentration zone. If the region 930 is the concentration zone, the peaks in the region 930 would be determined to qualified peaks and analyzed. For example, the system would include a peak 921 as part of the initial set of mode-labeled peaks. With further reference to FIG. 10, a system can provide the initial set of mode-labeled peaks for a variable-density log (VDL) such as the VDL plot 1000.

Figure 11:
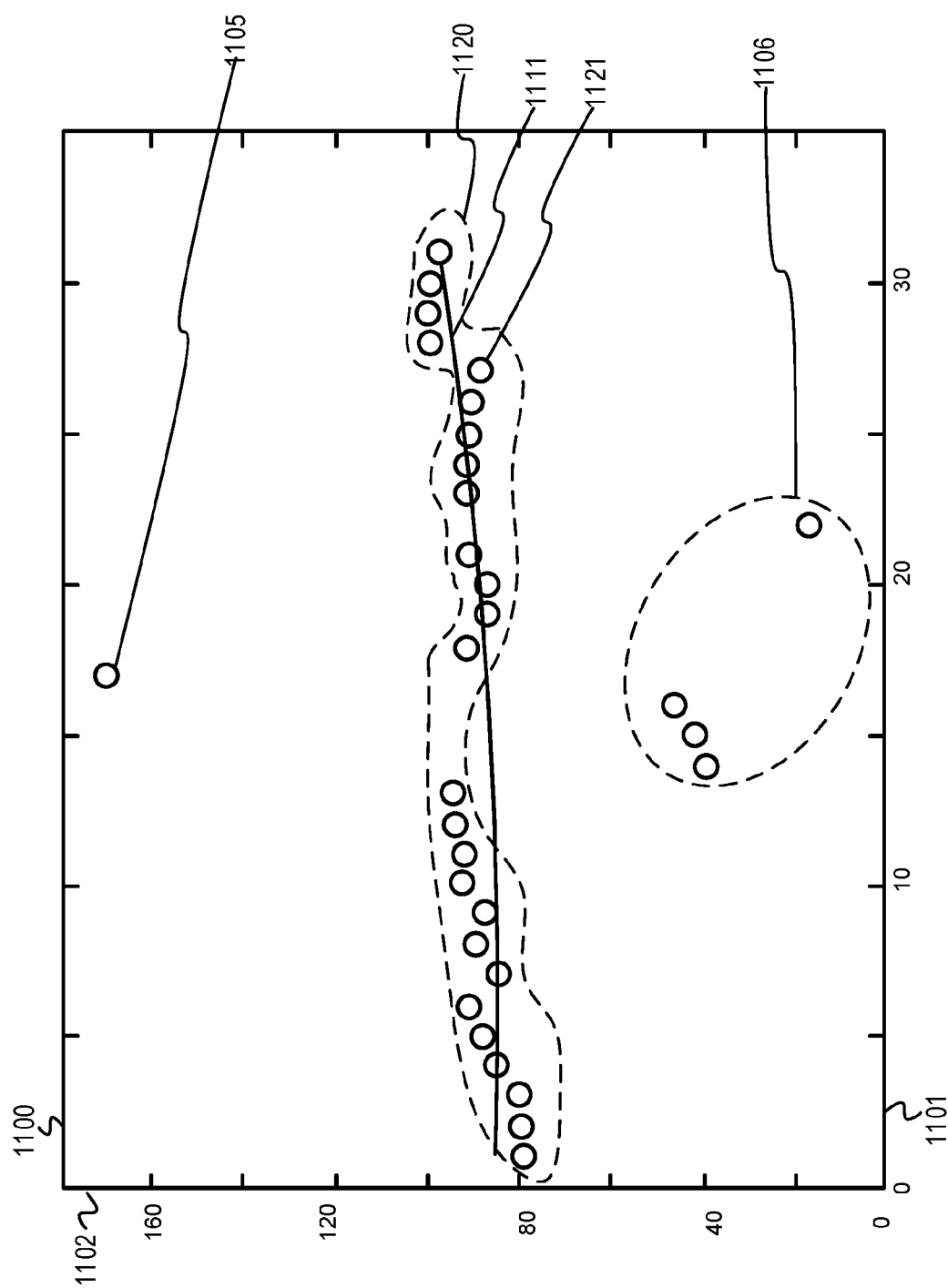
FIG. 11 depicts an example plot including an initial set of mode-labeled peaks and a compression wave prediction generated based on the initial set of mode-labeled peaks.

FIG. 10 depicts density measurements of an example variable-density log (VDL) and their corresponding peaks at various depths. The example VDL plot 1000 has a horizontal axis 1001 representing slowness in microseconds per foot and a vertical axis 1002 representing a formation depth in feet. The VDL plot 1000 shows the distribution of slowness in the travel-time and slowness domains. The first cross-hatched region 1010 represents a first set of elevated density measurements, wherein each measured density value in the first cross-hatched region 1010 is greater than the non-hatched region 1063. Each of the peaks 1012 represent a particular local maximum density measurement with respect to slowness for each formation depth, wherein a density measurement represents a density of waves at a particular depth and slowness. In some embodiments, the concentration zone 1003 can be determined by pre-determined depth limits and slowness thresholds. Alternatively, with reference to FIG. 6, the concentration zone 1003 can be determined based on operations disclosed above for block 608. With further reference to FIG. 11, a system can generate a prediction curve similar to the compression wave prediction curve 1111 based on the qualified peaks 1030 within the concentration zone 1003.

FIG. 11 depicts an example plot including an initial set of mode-labeled peaks and a compression wave prediction generated based on the initial set of mode-labeled peaks. The plot 1100 has a horizontal axis 1101 representing indices of data acquisition at different depths and a vertical axis 1102 representing slowness in microseconds per foot. The plot 1100 includes a set of qualified peaks 1120 including a qualified peak 1121. The plot 1100 also includes peaks outside of the concentration zone such as the non-qualified peak 1105 and a group of non-qualified peaks 1106. A compression wave prediction curve 1111 can be generated based on the set of qualified peaks 1120 and the accuracy of the compression wave prediction curve 1111 can be increased by ignoring or reducing the weighting of each of the peaks outside of the concentration zone when generating the compression wave prediction curve 1111. For example, the compression wave prediction curve 1111 can be generated by fitting a parabola function to the set of qualified peaks 1120, wherein the accuracy of the compression wave prediction curve 1111 is improved by ignoring the non-qualified peak 1105 and the group of non-qualified peaks 1106.

Figure 12:
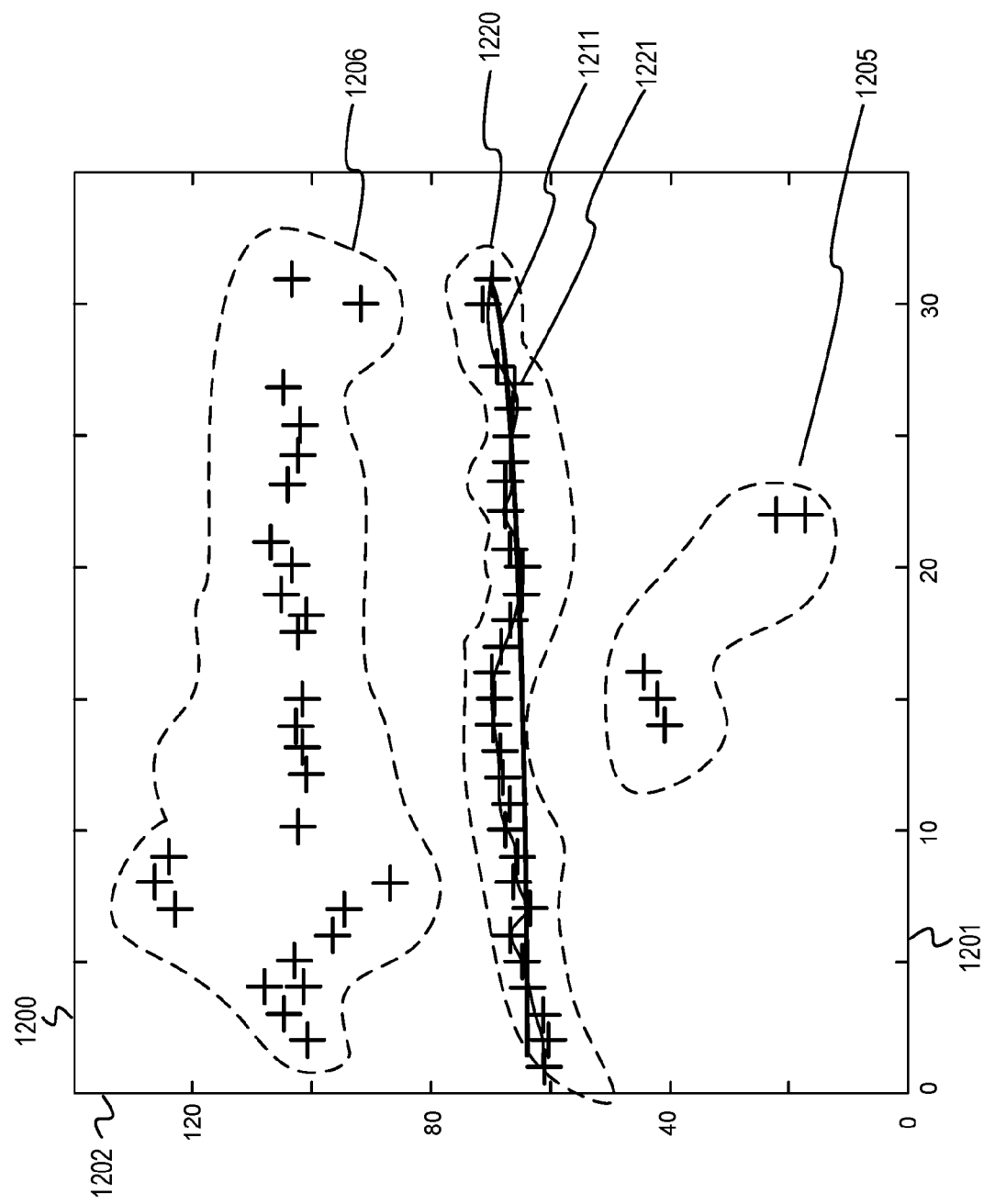
FIG. 12 depicts an example plot including a set of augmented qualified peaks and compression wave prediction used to select the set of augmented qualified peaks.

FIG. 12 depicts an example plot including a set of augmented qualified peaks and compression wave prediction used to select the set of augmented qualified peaks The plot 1200 has a horizontal axis 1201 representing indices of data acquisition at different depths and a vertical axis 1202 representing slowness in microseconds per foot. The plot 1200 includes a set of augmented qualified peaks 1220 including an augmented qualified peak 1221, wherein a subset of the set of augmented qualified peaks 1220 correspond with qualified peaks inside of a concentration zone that can be used to generate the peak prediction curve 1211. The plot 1200 also includes peaks outside of the concentration zone including a first group of non-qualified peaks 1205 and second group of non-qualified peaks 1206. In addition, other peaks of the set of augmented qualified peaks 1220 can be selected based on the peak prediction curve 1211. In some embodiments, the peak prediction curve 1211 can be used to provide the values $s_{pred}$ for Equation 15 above, which shows that the peaks in the determined slowness range with the maximum semblance are selected as the final slowness values. For example, if $s_{th}$ is 10 microseconds per foot, then the peaks with the greatest semblance values within a slowness range of 10 microseconds per foot from the predicted slowness values are the peaks used for the final slowness. Each of the set of augmented qualified peaks 1220 can be used to determine one or more DTC/DTRS values.

Figure 13:
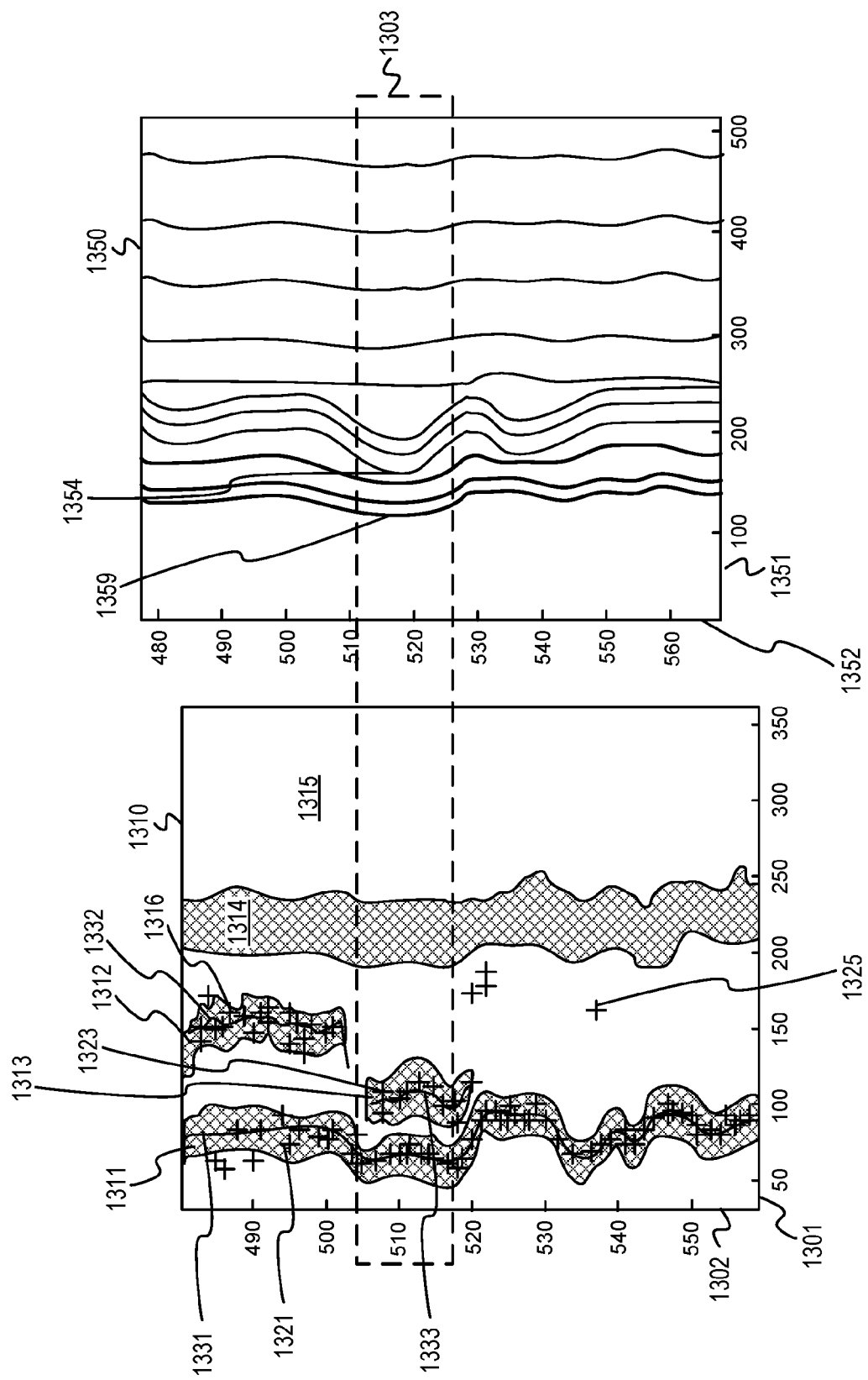
FIG. 13 depicts an example variable-density log (VDL) and its corresponding travel time log for a thin fast formation layer.

FIG. 13 depicts an example variable-density log (VDL) and its corresponding travel time log for a thin fast formation layer. The VDL 1310 has a horizontal axis 1301 representing slowness in microseconds per foot and a vertical axis 1302 representing indices of data acquisition at different depths.

The VDL 1310 is split into a first elevated region 1311, a second elevated region 1312, a third elevated region 1313, and a fourth elevated region 1314. Each of the density values in the elevated regions are greater than non-elevated regions such as the non-elevated region 1315. While the VDL 1310 shows only elevated semblance regions and a non-elevated semblance region, alternative VDLs can be generated to represent more than two categories and/or any arbitrary range of values (e.g. a color spectrum, high/medium/low categorical values, a range from 0-100, etc.). Some of the peaks of the regions are shown and include the peaks 1316, 1321, 1323, and 1325 represent a peak density value at a depth. Some of the peaks, such as the peaks 1316, 1321 and 1323 can be within elevated regions. Some of the peaks, such as the peak 1325, can be outside of any elevated regions. The density values can be used as an initial boundary to generate a concentration zone, wherein a fitting method can be applied to the peaks inside of the concentration zone to generate a slowness prediction curve within that elevated region. A system can apply a fitting method to generates a prediction curve 1331 based on one or more peak values in the first elevated region 1311, such as the peak 1321. Similarly, prediction curves 1332 and 1333 can be based on one or more peak values in their respective elevated regions 1312 (which contains the peak 1316) and 1313 (which contains the peak 1323). The VDL shows a relatively rapid change in the VDL indices of data acquisition at depths near 510 feet. In some embodiments, this relatively rapid change can be used to track a fast layer.

The example travel time log 1350 shown to the right of the VDL 1310 includes a set of subsurface wave measurements from seismic sensors, wherein each of the lines represent high signal values. The travel time log 1350 has a horizontal axis 1351 representing time in microseconds and a vertical axis 1302 representing indices of data acquisition at different depths. These high signal values correspond with formation waves and include both an initial compression wave and an initial shear wave. At the fast zone 1303, a sudden change of the formation can be observed in the travel time log 1350. The formation change can also be observed in the travel-time log in the form of the peak 1359 which corresponds with the compressional waves and the shape of the peak 1354 which corresponds with the refracted shear waves. Thus, some embodiments can track DTC and DTRS based on the changes in the travel time logs of the peaks.

Figure 14:
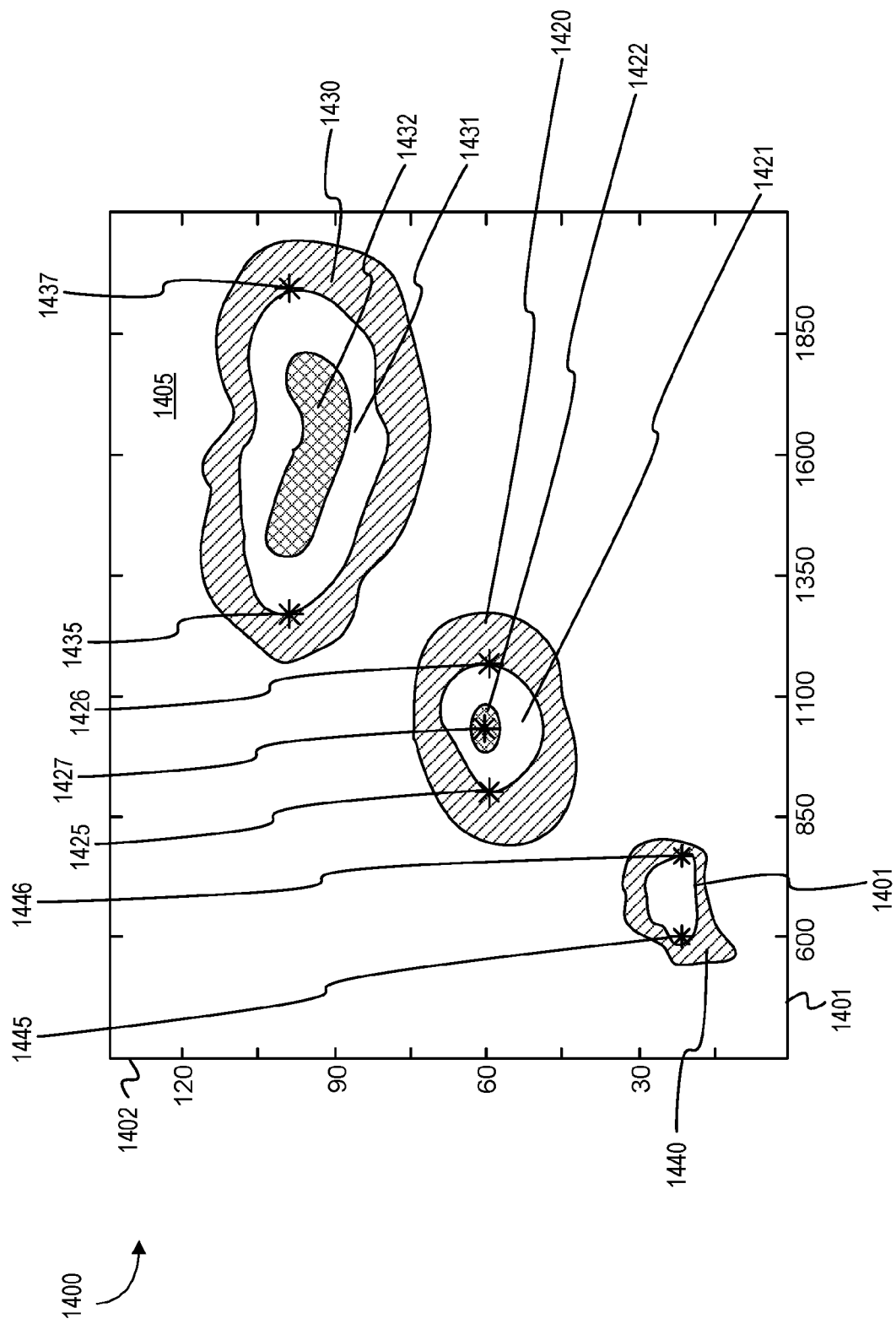
FIG. 14 depicts an example DPTS map showing a set of boundary travel times.

FIG. 14 depicts an example DPTS map showing a set of boundary travel times. The DPTS map 1400 has a horizontal axis 1401 representing time in microseconds and a vertical axis 1402 representing slowness in microseconds per feet. The DPTS map 1400 has a horizontal axis 1401 representing time in microseconds and a vertical axis 1402 representing slowness in microseconds per foot. The slowness-time map 1400 shows slowness-time density values and particular guesses for the slowness and time of occurrence corresponding to compression waves. The baseline density region 1405 represents a region wherein each of the slowness-time density values are less than a slowness-time density threshold $L_0$. Separated from the baseline density region 1405 are elevated regions having slowness-time density values greater than the density values of the baseline density region 1405 by the slowness-time density thresholds $L_0$, $L_1$ and $L_2$, wherein $L_0 < L_1 < L_2$. Lower elevated regions 1420, 1430, and 1440 represents regions wherein the slowness-time density values are greater than or equal to $L_0$. Middle elevated regions 1421, 1431, and 1441 represent regions wherein the slowness-time density values are greater than or equal to $L_1$.

The upper elevated regions 1422 and 1432 represent regions wherein the slowness-time density values are greater than or equal to $L_2$.

In some embodiments, a travel time can be determined based on a peak that directly corresponds with a maximum density value, such as the peak 1427. In such a case, the travel time can be determined based directly on the slowness and time measurement. Alternatively, a travel time can be determined based on a mode start time and a mode end time, wherein the mode start time and the mode end time can be for a time value. For example, the mode start time corresponding with the boundary point 1425 and mode end time corresponding with the boundary point 1426 correspond with a boundary defined by the elevated region 1421 and its corresponding slowness-time density threshold $L_1$. Likewise, the boundary points 1445 and 1446 correspond with a boundary defined by the region 1441. Likewise, the boundary points 1435 and 1437 correspond with a boundary defined by the elevated region 1431. In alternative embodiments, the slowness-time density thresholds used to define boundary values can be different between one mode and another mode. For example, the slowness-time density threshold used to determine the boundary points 1425 and 1426 can be different from the slowness-time density threshold to determine the boundary points 1445 and 1446. These boundary points can be used to track points and increase accuracy when a system fills in for a missing effective slowness by setting upper and lower limits for a peak in the DPTS map.

Figure 15:
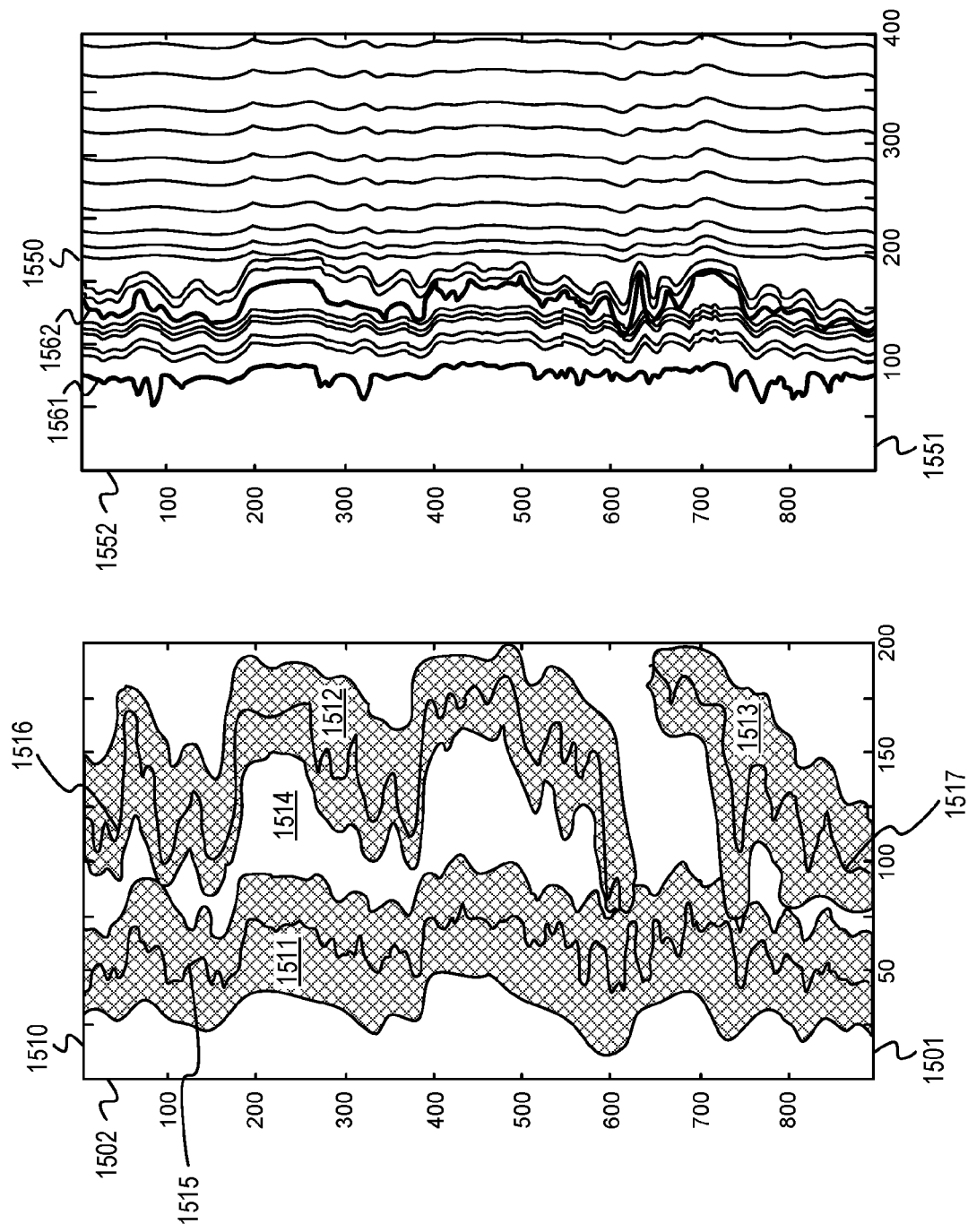
FIG. 15 depicts an example semblance variable-density log (VDL) overlaid by its corresponding slowness log for a fast bed formation and a sketch map for the wave trains.

FIG. 15 depicts an example semblance variable-density log (VDL) overlaid by its corresponding slowness log for a fast bed formation and a sketch map for the wave trains. The VDL 1510 has a horizontal axis 1501 representing slowness in microseconds per feet and a vertical axis 1502 representing indices of data acquisition at different depths. The VDL 1510 includes a first elevated semblance region 1511, a second elevated semblance region 1512, and a third elevated semblance region 1513, wherein each of the semblance values within the elevated semblance regions are greater than a semblance threshold. Non-elevated semblance values can be found in non-elevated regions, such as the non-elevated region 1514 of the VDL 1510. While not shown, the elevated semblance regions 1511, 1512, and 1513 include multiple peaks. These peaks can be used to generate a first compression prediction curve 1515 inside the first elevated semblance region 1511. The compression slowness prediction curve can be used to generate at least one augmented qualified DTC value. The at least one augmented qualified DTC value can be used to select an initial set of shear peaks in the elevated semblance regions 1512 and 1513. With respect to FIG. 6, The initial set of shear peaks in the elevated semblance regions 1512 and 1513 can be used to generate the shear slowness prediction curves 1516 and 1517 and DTRS values as described for blocks 610-640.

The travel times 1550 shown to the right of the VDL 1510 includes a set of subsurface wave measurements from seismic sensors, wherein each of the lines represent high signal values. The travel times 1550 has a horizontal axis 1551 representing time in microseconds and a vertical axis 1552 representing indices of data acquisition at different depths. These high signal values correspond with formation waves and include both an initial compression wave and an initial shear wave. Changes in the compression waves and shear waves of travel times 1550 can be used to further select and/or filter out compression wave peaks and shear wave peaks, respectively. For example, a comparison between the wave measurement 1561 and the wave measurement 1562 can be used to augment the set of qualified peaks by determining that the wave measurement 1561 is the first measurement of a formation compressional wave and that the wave measurement 1562 is the ending measurement of a formation compressional wave. The time of the first measurement and time of the ending measurement can be used to filter for peaks in this time window.

Figure 16:
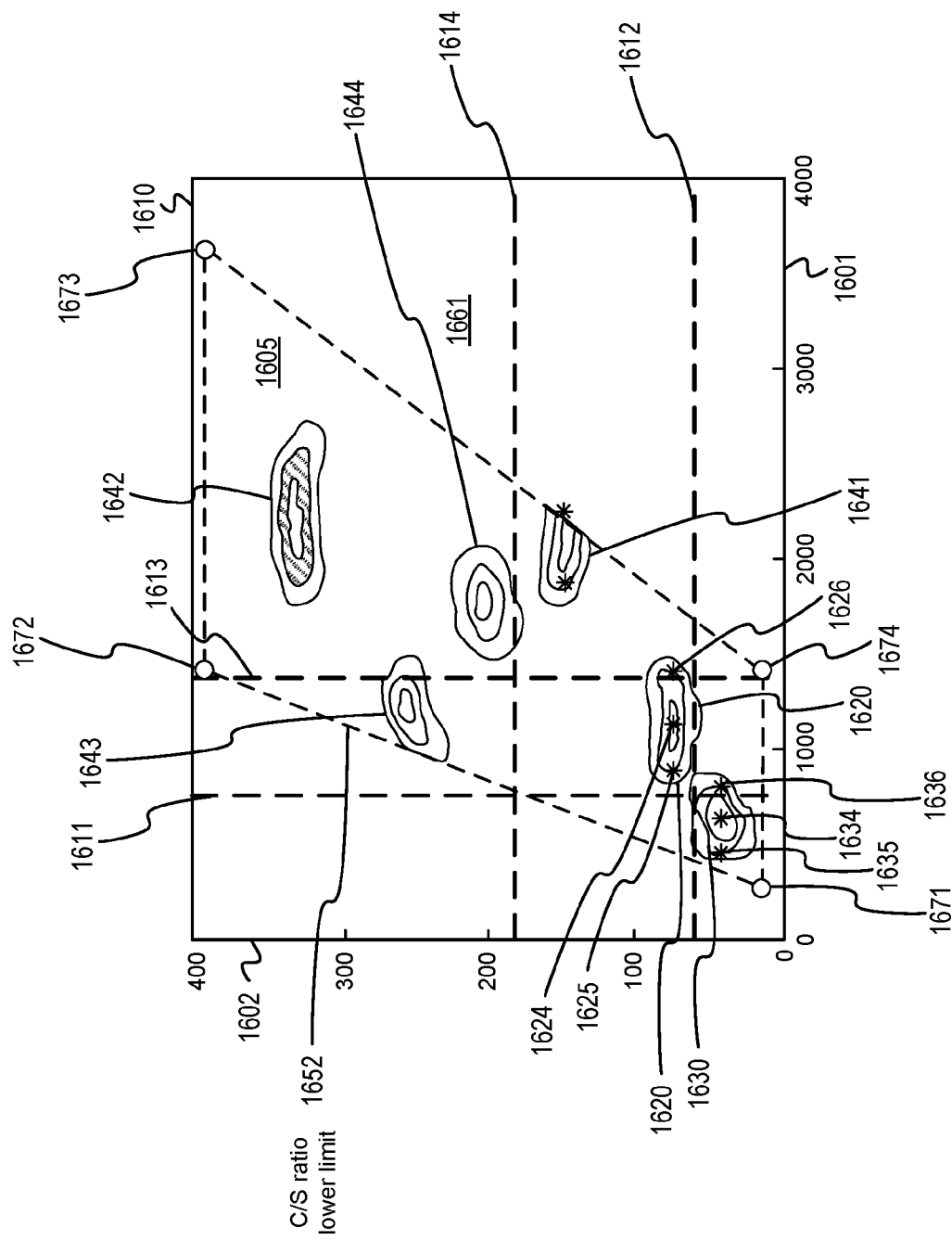
FIG. 16 depicts various results of using the slowness prediction system on an example DPTS map.

FIG. 16 depicts various results of using the slowness prediction system on an example DPTS map. The DPTS map 1610 has a horizontal axis 1601 representing time in microseconds and a vertical axis 1602 representing slowness in microseconds per feet. The target region 1605 is defined by points 1671-1674 (forming a slowness-time mask 1652) and represents a region wherein each of the slowness-time density values are less than a semblance threshold of $L_0$. An adaptive filter can select peaks in the slowness-time mask 1652 for semblance processing and avoid peaks in the non-target region 1661 (i.e. regions in the DPTS map 1610 not part of the target region 1605). These selected peaks can be compared to a $L_0$ semblance threshold to detect the region 1630 and determine that the region 1630 corresponds with a compression mode. The system can analyze an initial set of compression wave peaks in the region 1630. After generating a compression slowness prediction curve based on one or more sets of compression wave peaks in the region 1630, the system can select the peak 1634 as a qualified compression peak and also determine travel times corresponding with the positions 1635 and 1636 as boundary travel times.

By selecting and applying semblance processing on peaks in the target region 1605, a system can determine a DTC value corresponding with the peak 1634. This DTC can be used to determine a travel time lower limit 1611 and slowness lower limit 1612. In addition, the system can use a mud compression wave slowness value to determine the travel time upper limit 1613 and slowness upper limit 1614. After applying a searching range using these limits to the DPTS map, the system can determine that peaks in the region 1620 correspond with a shear mode. The system can apply semblance processing to the peaks in the region 1620 to select the peak 1624 as the qualified shear peak and also determine travel times corresponding with the positions 1625 and 1626 as boundary travel times. The qualified shear peak can then be used to determine a DTRS value, which can be used to measure formation properties.

By applying the adaptive filter, the system can filter out non-target wave modes that can interfere with the determination of DTC and DTRS values. For example, the region 1641 corresponding with a pseudo-Rayleigh (PS-Ray) wave mode, the region 1642 corresponding with a pseudo-Rayleigh alias, the region 1643 corresponding with the shear wave alias, and the region 1644 corresponding with a Stoneley wave mode can each be filtered out using slowness/travel time upper limits. By using the proposed method, the system is able to increase the accuracy of DTC and DTRS measurements.

Example Computer Device

Figure 17:
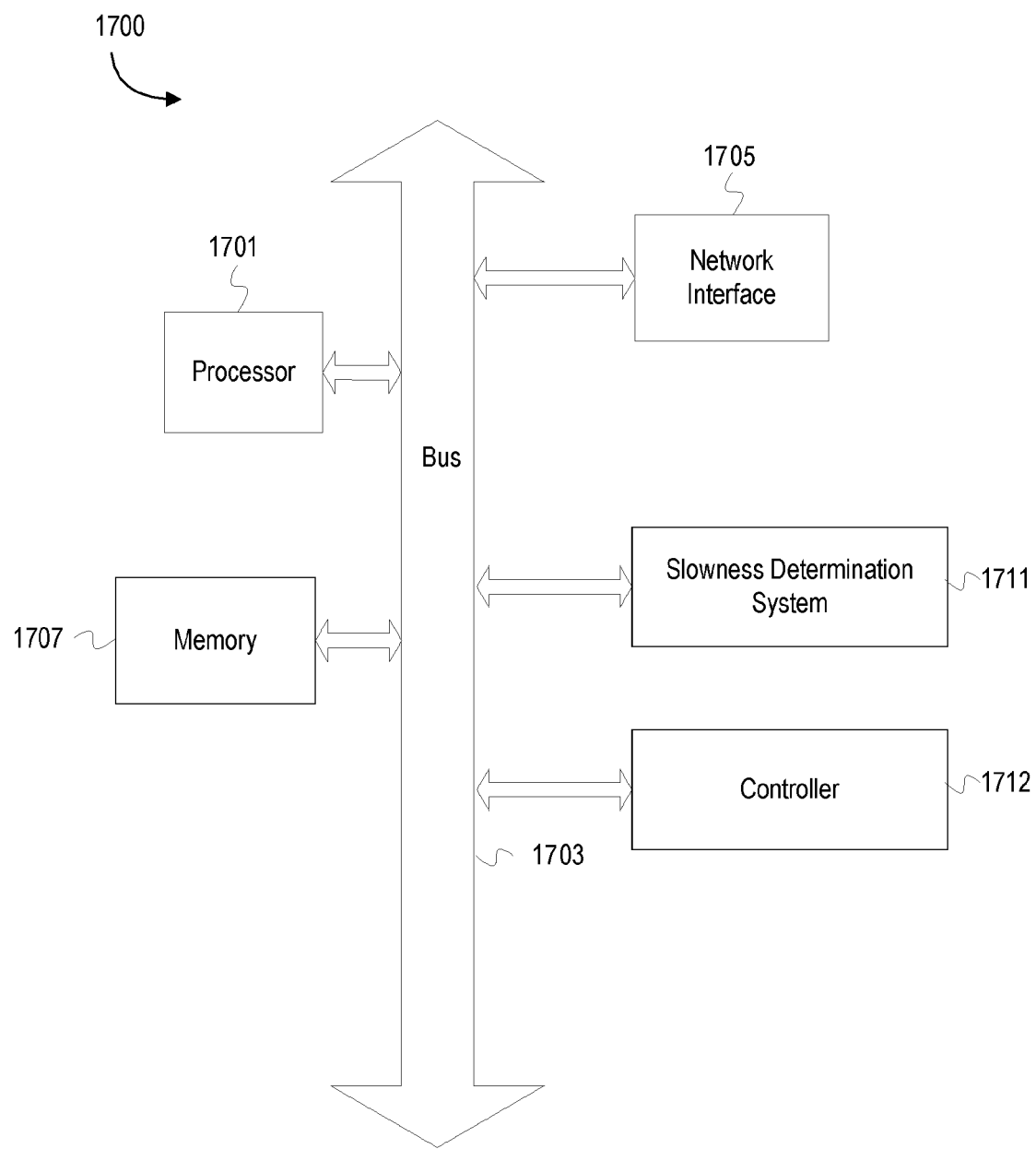
FIG. 17 depicts an example computer device.

FIG. 17 depicts an example computer device. A computer device 1700 includes a processor 1701 (possibly including multiple processors, multiple cores, multiple nodes, and/or implementing multi-threading, etc.). The computer device 1700 includes a memory 1707. The memory 1707 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1700 also includes a bus 1703 (e.g., PCI, ISA, PCI-Express, HyperTransport® bus, InfiniBand® bus, NuBus, etc.) and a network interface 1705 (e.g., a Fiber Channel interface, an Ethernet interface, an internet small computer system interface, SONET interface, wireless interface, etc.).

In some embodiments, the computer device 1700 includes a slowness determination system 1711 and controller 1712. The slowness determination system 1711 can perform one or more operations for determining DTC and DTRS values, including applying an adaptive filter and generating slowness prediction curves (as described above). A controller 1712 can also perform one or more operations for controlling a drilling system, well treatment system, or wireline system. Any one of the previously described functionalities can be partially (or entirely) implemented in hardware and/or on the processor 1701. For example, the functionality can be implemented with an application specific integrated circuit, in logic implemented in the processor 1701, in a co-processor on a peripheral device or card, etc. Further, realizations can include fewer or additional components not illustrated in FIG. 17 (e.g., video cards, audio cards, additional network interfaces, peripheral devices, etc.). The processor 1701 and the network interface 1705 are coupled to the bus 1703. Although illustrated as being coupled to the bus 1703, the memory 1707 can be coupled to the processor 1701. The computer device 1700 can be integrated into component(s) of the drill pipe downhole and/or be a separate device at the surface that is communicatively coupled to the BHA downhole for controlling and processing signals (as described herein).

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. As used in this application, a formation wave can be any compressional wave, shear wave, or combination thereof traveling through a formation. As used in this application, a formation wave is not limited to any particular frequency in this application and can have frequencies such as 10 Hertz, 500 Hertz, 9.9 kiloHertz, 1 megaHertz, etc.).

Example Embodiments

Example embodiments include the following:

Embodiment 1: An apparatus comprising: a mechanical wave source; a set of mechanical wave sensors in a borehole, wherein the set of mechanical wave sensors provide subsurface wave measurements based on formation waves generated by the mechanical wave source; a processor; and a machine-readable medium having program code executable by the processor to cause the apparatus to, acquire the subsurface wave measurements, select a first set of tool wave measurements based on the subsurface wave measurements, generate a set of filtered subsurface wave measurements by filtering the subsurface wave measurements based on the first set of tool wave measurements, generate a time-domain semblance map based on the set of filtered subsurface wave measurements, wherein the time-domain semblance map comprises an initial set of compression wave peaks, determine a selected qualified compression wave peak based on a semblance value in the time-domain semblance map, and determine a compression wave slowness based on the selected qualified compression wave peak.

Embodiment 2: The apparatus of Embodiment 1, wherein the program code further comprises program code to: apply a filter on the first set of tool wave measurements; stack the first set of tool wave measurements to a reference depth; and generate a set of local-predicted tool wave measurements.

Embodiment 3: The apparatus of Embodiments 1 or 2, wherein the program code further comprises program code to: determine a tool wave template either from a fluid-tank or a very soft formation zone; generate a reconstructed tool wave measurement based on a comparison of the set of local-predicted tool wave measurements and the tool wave template; and generate the set of filtered subsurface wave measurements based on the reconstructed tool wave measurement.

Embodiment 4: The apparatus of any of Embodiments 1-3, wherein the program code further comprises program code to cause the apparatus to: determine a formation type corresponding to the formation; determine a semblance threshold based on the formation type; determine a taper based on the formation type, wherein filtering the subsurface wave measurements comprises applying the taper on the subsurface wave measurements; and compare each of a set of peaks corresponding to the set of filtered subsurface wave measurements to the semblance threshold, wherein the program code to generate the initial set of compression wave peaks comprises program code to select peaks from the set of peaks that satisfy the semblance threshold.

Embodiment 5: The apparatus of any of Embodiments 1-4, wherein the program code to determine the selected qualified compression wave peak further comprises program code to: generate a slowness-time density log based on the initial set of compression wave peaks; select a set of qualified compression wave peaks based on a threshold range on the slowness-time density log; generate a compression wave slowness prediction curve based on the set of qualified compression wave peaks; select a second set of qualified compression wave peaks based on a second threshold range that is determined based on the compression wave slowness prediction curve; and determine the selected qualified compression wave peak based on at least one of the second set of qualified compression wave peaks that satisfies one or more travel times thresholds.

Embodiment 6: The apparatus of any of Embodiments 1-5, wherein the program code to determine the selected qualified compression wave peak further comprises program code to: identify a start time of a compression mode and an end time of the compression mode at a neighboring depth; and determine the selected qualified compression wave peak based on a range determined by the start time of the compression mode and the end time of the compression mode.

Embodiment 7: The apparatus of any of Embodiments 1-6, wherein the program code further comprises program code to: generate a shear searching range having a lower bound based on the compression wave slowness; determine an initial set of shear wave peaks based on peaks in the shear searching range; and determine a shear wave slowness based on the initial set of shear wave peaks.

Embodiment 8: The apparatus of any of Embodiments 1-7, wherein the program code to determine the shear wave slowness further comprises program code to: generate a slowness-time density log based on the initial set of shear wave peaks; select a set of qualified shear wave peaks based on a threshold range on the slowness-time density log; generate a shear wave slowness prediction curve based on the set of qualified shear wave peaks; select a second set of qualified shear wave peaks based on a second threshold range that is determined based on the shear wave slowness prediction curve; determine a selected qualified shear wave peak based on the second set of qualified shear wave peaks; and determine the shear wave slowness based on the selected qualified shear wave peak.

Embodiment 9: The apparatus of any of Embodiments 1-8, further comprising program code to cause the apparatus to determine an upper bound for the shear searching range based on a travel time corresponding to a mud compression wave slowness.

Embodiment 10: One or more non-transitory machine-readable media comprising program code for determining a formation wave slowness, the program code to: acquire subsurface wave measurements from a formation based on formation waves generated by a mechanical wave source; select a first set of tool wave measurements based on the subsurface wave measurements; generate a set of filtered subsurface wave measurements by filtering the subsurface wave measurements based on the first set of tool wave measurements; generate a time-domain semblance map based on the set of filtered subsurface wave measurements, wherein the time-domain semblance map comprises an initial set of compression wave peaks; determine a selected qualified compression wave peak based on a semblance value in the time-domain semblance map; and determine a compression wave slowness based on the selected qualified compression wave peak.

Embodiment 11: The machine-readable media of Embodiment 10, further comprises program code to: apply a filter on the first set of tool wave measurements, or stacking the first set of tool wave measurements to a reference depth, and generate a set of local-predicted tool wave measurements.

Embodiment 12: The machine-readable media of Embodiments 10 or 11, further comprising program code to: determine a tool wave template either from a fluid-tank or a very soft formation zone; generate a reconstructed tool wave measurement based on a comparison of the set of local-predicted tool wave measurements and the tool wave template; and generate the set of filtered subsurface wave measurements based on the reconstructed tool wave measurement.

Embodiment 13: The machine-readable media of any of Embodiments 10-12, further comprising program code to: determine a formation type corresponding to the formation; determine a semblance threshold based on the formation type; determine a taper based on the formation type, wherein filtering the subsurface wave measurements comprises applying the taper on the subsurface wave measurements; and compare each of a set of peaks corresponding to the set of filtered subsurface wave measurements to the semblance threshold, wherein the program code to generate the initial set of compression wave peaks comprises program code to select peaks from the set of peaks that satisfy the semblance threshold.

Embodiment 14: The machine-readable media of any of Embodiments 10-13, further comprising program code to: generate a slowness-time density log based on the initial set of compression wave peaks; select a set of qualified compression wave peaks based on a threshold range on the slowness-time density log; generate a compression wave slowness prediction curve based on the set of qualified compression wave peaks; and select a second set of qualified compression wave peaks based on a second threshold range that is determined based on the compression wave slowness prediction curve, wherein the selected qualified compression wave peak is determined based on the at least one of the second set of qualified compression wave peaks that satisfies one or more travel time thresholds.

Embodiment 15: The machine-readable media of any of Embodiments 10-14, further comprising program code to: generate a shear searching range having a lower bound based on the compression wave slowness; determine an initial set of shear wave peaks based on peaks in the shear searching range; and determine a shear wave slowness based on the initial set of shear wave peaks.

Embodiment 16: The machine-readable media of any of Embodiments 10-15, further comprising program code to: generate a slowness-time density log based on the initial set of shear wave peaks; select a set of qualified shear wave peaks based on a threshold range on the slowness-time density log; generate a shear wave slowness prediction curve based on the qualified shear wave peaks; select a second set of qualified shear wave peaks based on a second threshold range that is determined based on the shear wave slowness prediction curve; determine a selected qualified shear wave peak based on the second set of qualified shear wave peaks; and determine the shear wave slowness based on the selected qualified shear wave peak.

Embodiment 17: A method comprising: acquiring subsurface wave measurements from a formation based on mechanical waves generated by a mechanical wave source; selecting a first set of tool wave measurements based on the subsurface wave measurements; generating a set of filtered subsurface wave measurements by filtering the subsurface wave measurements based on the first set of tool wave measurements; generating a time-domain semblance map based on the set of filtered subsurface wave measurements, wherein the time-domain semblance map comprises an initial set of compression wave peaks; determine a selected qualified compression wave peak based on a semblance value in the time-domain semblance map; and determining a compression wave slowness based on the selected qualified compression wave peak.

Embodiment 18: The method of Embodiment 17, further comprising: determining a formation type corresponding to the formation; determining a semblance threshold based on the formation type; and comparing each of a second set of peaks corresponding to the set of filtered subsurface wave measurements to the semblance threshold, wherein the generating the initial set of compression wave peaks comprises selecting peaks from the second set of peaks that satisfy the semblance threshold.

Embodiment 19: The method of Embodiments 17 or 18, further comprising: determining a tool wave template based on at least one of a formation type or a fluid property; generating a reconstructed tool wave measurement based on a comparison of the first set of tool wave measurements and the tool wave template; and generating the set of filtered subsurface wave measurements based on the reconstructed tool wave measurement.

Embodiment 20: The method of any of Embodiments 17-19, further comprising: generating a compression wave slowness prediction curve based on the initial set of compression wave peaks; selecting a set of qualified compression wave peaks based on a threshold range from the compression wave slowness prediction curve; and selecting the qualified compression wave peak based on the set of qualified compression wave peaks.

Embodiment 21: The method of any of Embodiments 17-20, further comprising: generating a shear searching range having a lower bound based on the compression wave slowness; determining an initial set of shear wave peaks based on peaks in the shear searching range; and determining a shear wave travel time based on the initial set of shear wave peaks.

Embodiment 22: The method of any of Embodiments 17-21, further comprising: generating a shear wave slowness prediction curve based on the initial set of shear wave peaks; selecting a set of qualified shear wave peaks based on a threshold range from the shear wave slowness prediction curve; determining a qualified shear wave peak based on the set of qualified shear wave peaks; and determining the shear wave travel time based on the qualified shear wave peak.

Embodiment 23: The method of any of Embodiments 17-22, further comprising determining an upper bound for the shear searching range based on a travel time corresponding to a mud compression wave slowness.

What is claimed is:

1. An apparatus comprising:
 a mechanical wave source;
 a set of mechanical wave sensors placed in a borehole drilled into a formation, wherein the set of mechanical wave sensors provide subsurface wave measurements based on formation waves generated by the mechanical wave source;
 a processor; and
 a machine-readable medium having program code executable by the processor to cause the apparatus to:
  acquire the subsurface wave measurements;
  select a first set of tool wave measurements based on a common offset from the mechanical wave source;
  generate a set of filtered subsurface wave measurements by filtering the subsurface wave measurements based on the first set of tool wave measurements;
  generate a time-domain semblance map based on the set of filtered subsurface wave measurements, wherein the time-domain semblance map comprises an initial set of compression wave peaks;
  determine a selected qualified compression wave peak based on a semblance value in the time-domain semblance map;
  determine a compression wave slowness based on the selected qualified compression wave peak; and
  perform a drilling operation based, at least in part, on the compression wave slowness.

2. The apparatus of claim 1, wherein the program code further comprises program code to:
 apply a filter on the first set of tool wave measurements;
 stack the first set of tool wave measurements to a reference depth; and
 generate a set of local-predicted tool wave measurements.

3. The apparatus of claim 2, wherein the program code further comprises program code to:
 determine a tool wave template either from a fluid-tank or a very soft formation zone;
 generate a reconstructed tool wave measurement based on a comparison of the set of local-predicted tool wave measurements and the tool wave template; and
 generate the set of filtered subsurface wave measurements based on the reconstructed tool wave measurement.

4. The apparatus of claim 1, wherein the program code further comprises program code to cause the apparatus to:
 determine a formation type corresponding to the formation;
 determine a semblance threshold based on the formation type;
 determine a taper based on the formation type, wherein filtering the subsurface wave measurements comprises applying the taper on the subsurface wave measurements; and
 compare each of a set of peaks corresponding to the set of filtered subsurface wave measurements to the semblance threshold, wherein the program code to generate the initial set of compression wave peaks comprises program code to select peaks from the set of peaks that satisfy the semblance threshold.

5. The apparatus of claim 1, wherein the program code to determine the selected qualified compression wave peak further comprises program code to:
 generate a slowness-time density log based on the initial set of compression wave peaks;
 select a set of qualified compression wave peaks based on a threshold range on the slowness-time density log;
 generate a compression wave slowness prediction curve based on the set of qualified compression wave peaks;
 select a second set of qualified compression wave peaks based on a second threshold range that is determined based on the compression wave slowness prediction curve; and
 determine the selected qualified compression wave peak based on at least one of the second set of qualified compression wave peaks that satisfies one or more travel times thresholds.

6. The apparatus of claim 5, wherein the program code to determine the selected qualified compression wave peak further comprises program code to:
 identify a start time of a compression mode and an end time of the compression mode at a neighboring depth; and
 determine the selected qualified compression wave peak based on a range determined by the start time of the compression mode and the end time of the compression mode.

7. The apparatus of claim 1, wherein the program code further comprises program code to:
 generate a shear searching range having a lower bound based on the compression wave slowness;
 determine an initial set of shear wave peaks based on peaks in the shear searching range; and
 determine a shear wave slowness based on the initial set of shear wave peaks.

8. The apparatus of claim 7, wherein the program code to determine the shear wave slowness further comprises program code to:
 generate a slowness-time density log based on the initial set of shear wave peaks;
 select a set of qualified shear wave peaks based on a threshold range on the slowness-time density log;
 generate a shear wave slowness prediction curve based on the set of qualified shear wave peaks;
 select a second set of qualified shear wave peaks based on a second threshold range that is determined based on the shear wave slowness prediction curve;
 determine a selected qualified shear wave peak based on the second set of qualified shear wave peaks; and
 determine the shear wave slowness based on the selected qualified shear wave peak.

9. The apparatus of claim 7, further comprising program code to cause the apparatus to determine an upper bound for the shear searching range based on a travel time corresponding to a mud compression wave slowness.

10. One or more non-transitory machine-readable media comprising program code for determining a formation wave slowness, the program code to:
    acquire subsurface wave measurements from a formation based on formation waves generated by a mechanical wave source;
    select a first set of tool wave measurements based on a common offset from the mechanical wave source;
    generate a set of filtered subsurface wave measurements by filtering the subsurface wave measurements based on the first set of tool wave measurements;
    generate a time-domain semblance map based on the set of filtered subsurface wave measurements, wherein the time-domain semblance map comprises an initial set of compression wave peaks;
    determine a selected qualified compression wave peak based on a semblance value in the time-domain semblance map;
    determine a compression wave slowness based on the selected qualified compression wave peak; and
    perform a drilling operation based, at least in part, on the compression wave slowness.

11. The machine-readable media of claim 10, further comprises program code to:
    apply a filter on the first set of tool wave measurements; or
    stack the first set of tool wave measurements to a reference depth; and
    generate a set of local-predicted tool wave measurements.

12. The machine-readable media of claim 11, further comprising program code to:
    determine a tool wave template either from a fluid-tank or a very soft formation zone;
    generate a reconstructed tool wave measurement based on a comparison of the set of local-predicted tool wave measurements and the tool wave template; and
    generate the set of filtered subsurface wave measurements based on the reconstructed tool wave measurement.

13. The machine-readable media of claim 10, further comprising program code to:
    determine a formation type corresponding to the formation;
    determine a semblance threshold based on the formation type;
    determine a taper based on the formation type, wherein filtering the subsurface wave measurements comprises applying the taper on the subsurface wave measurements; and
    compare each of a set of peaks corresponding to the set of filtered subsurface wave measurements to the semblance threshold, wherein the program code to generate the initial set of compression wave peaks comprises program code to select peaks from the set of peaks that satisfy the semblance threshold.

14. The machine-readable media of claim 10, further comprising program code to:
    generate a slowness-time density log based on the initial set of compression wave peaks;
    select a set of qualified compression wave peaks based on a threshold range on the slowness-time density log;
    generate a compression wave slowness prediction curve based on the set of qualified compression wave peaks; and
    select a second set of qualified compression wave peaks based on a second threshold range that is determined based on the compression wave slowness prediction curve, wherein the selected qualified compression wave peak is determined based on the at least one of the second set of qualified compression wave peaks that satisfies one or more travel time thresholds.

15. The machine-readable media of claim 10, further comprising program code to:
    generate a shear searching range having a lower bound based on the compression wave slowness;
    determine an initial set of shear wave peaks based on peaks in the shear searching range; and
    determine a shear wave slowness based on the initial set of shear wave peaks.

16. The machine-readable media of claim 15, further comprising program code to:
    generate a slowness-time density log based on the initial set of shear wave peaks;
    select a set of qualified shear wave peaks based on a threshold range on the slowness-time density log;
    generate a shear wave slowness prediction curve based on the set of qualified shear wave peaks;
    select a second set of qualified shear wave peaks based on a second threshold range that is determined based on the shear wave slowness prediction curve;
    determine a selected qualified shear wave peak based on the second set of qualified shear wave peaks; and
    determine the shear wave slowness based on the selected qualified shear wave peak.

17. A method comprising:
    acquiring subsurface wave measurements from a formation based on mechanical waves generated by a mechanical wave source;
    selecting a first set of tool wave measurements based on a common offset from the mechanical wave source;
    generating a set of filtered subsurface wave measurements by filtering the subsurface wave measurements based on the first set of tool wave measurements;
    generating a time-domain semblance map based on the set of filtered subsurface wave measurements, wherein the time-domain semblance map comprises an initial set of compression wave peaks;
    determine a selected qualified compression wave peak based on a semblance value in the time-domain semblance map;
    determining a compression wave slowness based on the selected qualified compression wave peak; and
    performing a drilling operation based, at least in part, on the compression wave slowness.

18. The method of claim 17, further comprising:
    determining a formation type corresponding to the formation;
    determining a semblance threshold based on the formation type; and comparing each of a second set of peaks corresponding to the set of filtered subsurface wave measurements to the semblance threshold, wherein the generating the initial set of compression wave peaks comprises selecting peaks from the second set of peaks that satisfy the semblance threshold.

19. The method of claim 17, further comprising:
determining a tool wave template based on at least one of a formation type or a fluid property;
generating a reconstructed tool wave measurement based on a comparison of the first set of tool wave measurements and the tool wave template; and
generating the set of filtered subsurface wave measurements based on the reconstructed tool wave measurement.

20. The method of claim 17, further comprising:
generating a compression wave slowness prediction curve based on the initial set of compression wave peaks; and
selecting a set of qualified compression wave peaks based on a threshold range from the compression wave slowness prediction curve, wherein determining the selected qualified compression wave peak based on the set of qualified compression wave peaks.

21. The method of claim 17, further comprising:
generating a shear searching range having a lower bound based on the compression wave slowness;
determining an initial set of shear wave peaks based on peaks in the shear searching range; and
determining a shear wave travel time based on the initial set of shear wave peaks.

22. The method of claim 21, further comprising:
generating a shear wave slowness prediction curve based on the initial set of shear wave peaks;
selecting a set of qualified shear wave peaks based on a threshold range from the shear wave slowness prediction curve;
determining a selected qualified shear wave peak based on the set of qualified shear wave peaks; and
determining the shear wave travel time based on the selected qualified shear wave peak.

23. The method of claim 21, further comprising determining an upper bound for the shear searching range based on a travel time corresponding to a mud compression wave slowness.

* * * * *